US011665737B2

(12) United States Patent
Khoshnevisan et al.

(10) Patent No.: US 11,665,737 B2
(45) Date of Patent: May 30, 2023

(54) SPATIAL RELATION INFORMATION BASED ON RANDOM ACCESS MESSAGES

(71) Applicant: QUALCOMM incorporated, San Diego, CA (US)

(72) Inventors: Mostafa Khoshnevisan, San Diego, CA (US); Yitao Chen, San Diego, CA (US); Xiaoxia Zhang, San Diego, CA (US); Jing Sun, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 28 days.

(21) Appl. No.: 17/246,281

(22) Filed: Apr. 30, 2021

(65) Prior Publication Data

US 2022/0353906 A1 Nov. 3, 2022

(51) Int. Cl.
*H04W 74/00* (2009.01)
*H04W 72/044* (2023.01)
(Continued)

(52) U.S. Cl.
CPC ....... *H04W 74/008* (2013.01); *H04W 72/046* (2013.01); *H04W 72/1268* (2013.01);
(Continued)

(58) Field of Classification Search
CPC ............. H04W 74/008; H04W 72/042; H04W 72/046; H04W 72/048; H04W 72/1268;
(Continued)

(56) References Cited

U.S. PATENT DOCUMENTS 10,764,896 B2   9/2020  Guo et al.
2019/0141693 A1* 5/2019  Guo .................... H04W 16/14
(Continued)

OTHER PUBLICATIONS

AT&T: "Enhancements on Multi-Beam Operation", 3GPP Draft, 3GPP TSG RAN WG1 #102-e, R1-2005954, 3rd Generation Partnership Project (3GPP), Mobile Competence Centre, 650, Route Des Lucioles, F-06921 Sophia-Antipolis Cedex, France, vol. RAN WG11, No. e-Meeting, Aug. 17, 2020-Aug. 28, 2020, Aug. 8, 2020 (Aug. 8, 2020), XP051917840, 4 Pages, Retrieved from the Internet: URL: https://ftp.3gpp.org/tsg_ran/WG1_RL1/TSGR1_102-e/Docs/R1-2005954.zip R1-2005954 Multi Beam Enhancements.docx [Retrieved on Aug. 8, 2020] The Whole Document.
(Continued)

*Primary Examiner* — Jael M Ulysse
(74) *Attorney, Agent, or Firm* — Holland & Hart LLP

(57) ABSTRACT

Methods, systems, and devices for wireless communication are described. A user equipment (UE) may transmit one or more random access messages during a random access procedure between the UE and a base station. The UE may receive a control signal that includes a spatial relation configuration for transmission, by the UE, of an uplink signal. The spatial relation configuration may indicate that transmission of the uplink signal is via a transmit beam used in transmitting one of the random access messages. The spatial relation configuration may configure a spatial relation information element (IE) to identify the random access message. The UE may receive the spatial relation configuration identifying the random access message, and the UE may transmit the uplink signal using a same transmit beam used for transmission of the random access message.

30 Claims, 16 Drawing Sheets

(51) Int. Cl.
*H04W 72/1268* (2023.01)
*H04W 74/08* (2009.01)
*H04W 72/23* (2023.01)
*H04W 72/51* (2023.01)

(52) U.S. Cl.
CPC ........... *H04W 72/23* (2023.01); *H04W 72/51* (2023.01); *H04W 74/006* (2013.01); *H04W 74/0833* (2013.01)

(58) Field of Classification Search
CPC ........... H04W 72/1289; H04W 74/006; H04W 74/0833
See application file for complete search history.

(56) References Cited

U.S. PATENT DOCUMENTS

| | | | |
|---|---|---|---|
| 2019/0313437 A1* | 10/2019 | Jung | H04L 5/0091 |
| 2019/0320469 A1* | 10/2019 | Huang | H04L 5/0044 |
| 2020/0119799 A1* | 4/2020 | Jung | H04W 52/48 |
| 2020/0267712 A1* | 8/2020 | Cirik | H04W 72/1268 |
| 2020/0288503 A1* | 9/2020 | Sahlin | H04L 5/0053 |
| 2020/0314664 A1* | 10/2020 | Zhou | H04L 5/0051 |
| 2021/0029650 A1* | 1/2021 | Cirik | H04W 52/146 |
| 2021/0051672 A1* | 2/2021 | Rastegardoost | H04W 72/21 |
| 2021/0051707 A1* | 2/2021 | Rastegardoost | H04W 72/23 |
| 2021/0051710 A1* | 2/2021 | Cirik | H04W 74/008 |
| 2021/0136802 A1* | 5/2021 | Cirik | H04L 5/0092 |
| 2021/0274535 A1* | 9/2021 | Yi | H04L 1/1671 |
| 2021/0274567 A1* | 9/2021 | Takeda | H04W 74/0841 |
| 2021/0314953 A1* | 10/2021 | Park | H04L 5/0091 |
| 2021/0360701 A1* | 11/2021 | Xu | H04L 5/0053 |
| 2022/0039072 A1* | 2/2022 | Babaei | H04L 5/0053 |
| 2022/0046714 A1* | 2/2022 | Zhou | H04L 5/0044 |
| 2022/0070943 A1* | 3/2022 | Xu | H04W 74/0841 |
| 2022/0095333 A1* | 3/2022 | Takeda | H04B 7/0695 |
| 2022/0095372 A1* | 3/2022 | Cozzo | H04L 5/0053 |
| 2022/0109540 A1* | 4/2022 | Cozzo | H04L 5/0091 |
| 2022/0109541 A1* | 4/2022 | Cirik | H04L 5/0023 |
| 2022/0159634 A1* | 5/2022 | Rastegardoost | H04L 5/0048 |
| 2022/0167425 A1* | 5/2022 | Lei | H04L 27/0008 |
| 2022/0174609 A1* | 6/2022 | Kang | H04W 52/42 |
| 2022/0183039 A1* | 6/2022 | Matsumura | H04B 7/0404 |
| 2022/0191940 A1* | 6/2022 | MolavianJazi | H04B 17/318 |
| 2022/0210844 A1* | 6/2022 | MolavianJazi | H04L 5/005 |

OTHER PUBLICATIONS

International Search Report and Written Opinion—PCT/US2022/022002—ISA/EPO—dated Jun. 3, 2022.

Moderator (ZTE Corporation): "Feature Lead Summary#1 on Support of Type A PUSCH Repetitions for Msg3", 3GPP Draft, 3GPP TSG RAN WG1 #104b-e, R1-2103829, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 13, 2021 (Apr. 13, 2021), XP051995269, 21 Pages, Retrieved from the Internet: URL: https://ftp.3gpp.org/tsg_ran/WG1_RL1/TSGR1_104b-e/Inbox/R1-2103829.zip R1-2103829 Feature Lead Summary #1 on Support of Type A PUSCH Repetitions for Msg3.docx [Retrieved on Apr. 13, 2021] pp. 1-4, 2.1 Differentiation and triggering mechanisms for Msg3 Repetition pp. 12-13, 2.8 Other Issues.

Samsung: "Multi-Beam Enhancements", 3GPP Draft, 3GPP TSG RAN WG1 #103-e, R1-2008148, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 23, 2020 (Oct. 23, 2020), XP051945331, 20 Pages, Retrieved from the Internet: URL: https://ftp.3gpp.org/tsg_ran/WG1_RL1/TSGR1_103-e/Docs/R1-2008148.zip R1-2008148 Multi-Beam Enhancements Final.docx [Retrieved on Oct. 23, 2020] p. 15, 5.2 Beam Acquisition During Initial Access (RACH Procedure.).

* cited by examiner

SPATIAL RELATION INFORMATION BASED ON RANDOM ACCESS MESSAGES

FIELD OF TECHNOLOGY

The present disclosure relates to wireless communication, including spatial relation information based on random access messages.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may transmit reference signals to a base station, for example, as part of one or more communications procedures. The UE may transmit the reference signals to the base station using an uplink beam, which may be based on a downlink beam used to receive signals from the base station.

SUMMARY

The described techniques relate to improved methods, systems, devices, and apparatuses that support spatial relation information based on random access messages. Generally, the described techniques provide for a base station to indicate a random access message corresponding to a preferred transmit beam for a user equipment (UE) to use for transmitting uplink signals. That is, the base station may indicate a random access message for transmit beam identification. The UE and the base station may perform a random access procedure to establish a connection. The UE may transmit one or more uplink random access messages during the random access procedure. The base station may select a transmit beam that is preferred by the base station from the transmit beam(s) used by the UE to transmit the one or more uplink random access messages. The base station may transmit a control signal to identify the random access message transmitted using the preferred transmit beam. The random access message indicated via the spatial relation configuration may be a preamble message, a physical uplink shared channel (PUSCH) message, or a reference signal used by the UE during the random access procedure. The control signal may include a spatial relation configuration for transmission, by the UE, of an uplink signal, such as a sounding reference signal (SRS), or some other uplink signal. The spatial relation configuration may indicate that transmission of the uplink signal is via a transmit beam used in transmitting the identified random access message. The UE may receive the control signal identifying the random access message, and the UE may transmit the uplink signal using the same transmit beam used for transmission of the random access message. In some examples, the uplink signal may be an SRS, a physical uplink control channel (PUCCH) signal, a configured grant (CG) PUSCH signal, a dynamic grant (DG) PUSCH signal, or a physical random access channel (PRACH) signal.

A method for wireless communication at a UE is described. The method may include transmitting a random access message during a random access procedure between the UE and a base station, receiving a control signal that includes a spatial relation configuration for transmission, by the UE, of an uplink signal, the spatial relation configuration indicating that transmission of the uplink signal is via a transmit beam used in transmitting the random access message, and transmitting the uplink signal using the transmit beam in accordance with the spatial relation configuration.

An apparatus for wireless communication at a UE is described. The apparatus may include a processor, memory coupled with the processor, and instructions stored in the memory. The instructions may be executable by the processor to cause the apparatus to transmit a random access message during a random access procedure between the UE and a base station, receive a control signal that includes a spatial relation configuration for transmission, by the UE, of an uplink signal, the spatial relation configuration indicating that transmission of the uplink signal is via a transmit beam used in transmitting the random access message, and transmit the uplink signal using the transmit beam in accordance with the spatial relation configuration.

Another apparatus for wireless communication at a UE is described. The apparatus may include means for transmitting a random access message during a random access procedure between the UE and a base station, means for receiving a control signal that includes a spatial relation configuration for transmission, by the UE, of an uplink signal, the spatial relation configuration indicating that transmission of the uplink signal is via a transmit beam used in transmitting the random access message, and means for transmitting the uplink signal using the transmit beam in accordance with the spatial relation configuration.

A non-transitory computer-readable medium storing code for wireless communication at a UE is described. The code may include instructions executable by a processor to transmit a random access message during a random access procedure between the UE and a base station, receive a control signal that includes a spatial relation configuration for transmission, by the UE, of an uplink signal, the spatial relation configuration indicating that transmission of the uplink signal is via a transmit beam used in transmitting the random access message, and transmit the uplink signal using the transmit beam in accordance with the spatial relation configuration.

In some examples of the method, apparatuses, and non-transitory computer-readable medium described herein, transmitting the random access message may include operations, features, means, or instructions for transmitting the random access message using the transmit beam, where the random access message indicated in the spatial relation configuration may be one of a preamble message, an uplink shared channel message, or a reference signal used by the UE during the random access procedure.

In some examples of the method, apparatuses, and non-transitory computer-readable medium described herein, receiving the control signal may include operations, features, means, or instructions for receiving the control signal as a radio resource control (RRC) signal or a medium access control (MAC) control element (CE) that configures the spatial relation configuration as a spatial relation information element.

Some examples of the method, apparatuses, and non-transitory computer-readable medium described herein may further include operations, features, means, or instructions for receiving a downlink control information (DCI) signal that schedules the uplink signal and that indicates an identity of the random access message for the spatial relation information element included in the control signal.

Some examples of the method, apparatuses, and non-transitory computer-readable medium described herein may further include operations, features, means, or instructions for transmitting the random access message, as a preamble random access message, during each of a set of multiple random access channel (RACH) occasions and identifying a specific one of the set of multiple RACH occasions on which transmission of the random access message was via the transmit beam.

In some examples of the method, apparatuses, and non-transitory computer-readable medium described herein, identifying the specific one of the set of multiple RACH occasions may include operations, features, means, or instructions for receiving an indication of the specific one of the set of multiple RACH occasions via the control signal including the spatial relation configuration or via a random access (RA) radio network temporary identifier (RNTI) corresponding to a second random access message received by the UE.

Some examples of the method, apparatuses, and non-transitory computer-readable medium described herein may further include operations, features, means, or instructions for transmitting the random access message, in the form of a preamble random access message, during a RACH occasion, where the random access message includes a set of random access repetition messages and identifying a specific one of the set of random access repetition messages on which transmission of the random access message was via the transmit beam.

In some examples of the method, apparatuses, and non-transitory computer-readable medium described herein, identifying the specific one of the set of random access repetition messages may include operations, features, means, or instructions for receiving an indication of a repetition number corresponding to the specific one of the set of random access repetition messages via the control signal including the spatial relation configuration or via an RA-RNTI corresponding to a second random access message received by the UE.

Some examples of the method, apparatuses, and non-transitory computer-readable medium described herein may further include operations, features, means, or instructions for transmitting the random access message via a set of multiple segments of a RACH occasion and receiving the control signal including the spatial relation configuration, where the spatial relation configuration indicates a segment of the set of multiple segments.

Some examples of the method, apparatuses, and non-transitory computer-readable medium described herein may further include operations, features, means, or instructions for transmitting the random access message via an uplink channel, where the random access message includes a set of uplink channel repetitions of the random access message and receiving the control signal including the spatial relation configuration, where the spatial relation configuration indicates an uplink channel repetition of the set of uplink channel repetitions.

Some examples of the method, apparatuses, and non-transitory computer-readable medium described herein may further include operations, features, means, or instructions for transmitting a set of one or more other uplink signals after performing the random access procedure using the transmit beam in accordance with the spatial relation configuration, where the set of one or more other uplink signals includes PUSCH signals, or PUCCH signals, or SRSs not configured for beam management, or a combination thereof.

Some examples of the method, apparatuses, and non-transitory computer-readable medium described herein may further include operations, features, means, or instructions for receiving an RRC configuration indicating the set of one or more other uplink signals.

Some examples of the method, apparatuses, and non-transitory computer-readable medium described herein may further include operations, features, means, or instructions for receiving a second control signal that includes a second spatial relation configuration for transmission, by the UE, of a second set of one or more other uplink signals, the second spatial relation configuration indicating that transmission of the second set of one or more other uplink signals may be via a second transmit beam and transmitting the second set of one or more other uplink signals using the second transmit beam in accordance with the second spatial relation configuration.

In some examples of the method, apparatuses, and non-transitory computer-readable medium described herein, the spatial relation configuration indicates spatial relation information, a transmission configuration indicator (TCI) state, or both corresponding to the transmit beam used in transmitting the random access message.

In some examples of the method, apparatuses, and non-transitory computer-readable medium described herein, the uplink signal includes a SRS, a PUCCH signal, a configured grant PUSCH signal, a dynamic grant PUSCH signal, or a PRACH signal.

A method for wireless communication at a base station is described. The method may include receiving, from a UE, a random access message during a random access procedure between the UE and the base station, transmitting, to the UE, a control signal that includes a spatial relation configuration for transmission, by the UE, of an uplink signal, the spatial relation configuration indicating that transmission of the uplink signal is via a transmit beam used in transmitting the random access message, and receiving, from the UE, the uplink signal using the transmit beam in accordance with the spatial relation configuration.

An apparatus for wireless communication at a base station is described. The apparatus may include a processor, memory coupled with the processor, and instructions stored in the memory. The instructions may be executable by the processor to cause the apparatus to receive, from a UE, a random access message during a random access procedure between the UE and the base station, transmit, to the UE, a control signal that includes a spatial relation configuration for transmission, by the UE, of an uplink signal, the spatial relation configuration indicating that transmission of the uplink signal is via a transmit beam used in transmitting the random access message, and receive, from the UE, the uplink signal using the transmit beam in accordance with the spatial relation configuration.

Another apparatus for wireless communication at a base station is described. The apparatus may include means for receiving, from a UE, a random access message during a random access procedure between the UE and the base station, means for transmitting, to the UE, a control signal that includes a spatial relation configuration for transmission, by the UE, of an uplink signal, the spatial relation configuration indicating that transmission of the uplink signal is via a transmit beam used in transmitting the random access message, and means for receiving, from the UE, the uplink signal using the transmit beam in accordance with the spatial relation configuration.

A non-transitory computer-readable medium storing code for wireless communication at a base station is described. The code may include instructions executable by a processor to receive, from a UE, a random access message during a random access procedure between the UE and the base station, transmit, to the UE, a control signal that includes a spatial relation configuration for transmission, by the UE, of an uplink signal, the spatial relation configuration indicating that transmission of the uplink signal is via a transmit beam used in transmitting the random access message, and receive, from the UE, the uplink signal using the transmit beam in accordance with the spatial relation configuration.

In some examples of the method, apparatuses, and non-transitory computer-readable medium described herein, receiving the random access message may include operations, features, means, or instructions for receiving the random access message using the transmit beam, where the random access message indicated in the spatial relation configuration may be one of a preamble message, an uplink shared channel message, or a reference signal used by the UE during the random access procedure.

In some examples of the method, apparatuses, and non-transitory computer-readable medium described herein, transmitting the control signal may include operations, features, means, or instructions for transmitting the control signal as an RRC signal or a MAC-CE that configures the spatial relation configuration as a spatial relation information element.

Some examples of the method, apparatuses, and non-transitory computer-readable medium described herein may further include operations, features, means, or instructions for transmitting a DCI signal that schedules the uplink signal and that indicates an identity of the random access message for the spatial relation information element included in the control signal.

Some examples of the method, apparatuses, and non-transitory computer-readable medium described herein may further include operations, features, means, or instructions for receiving the random access message, as a preamble random access message, during each of a set of multiple RACH occasions and transmitting, to the UE, an indication of a specific one of the set of multiple RACH occasions on which reception of the random access message was via the transmit beam, where the indication of the specific one of the set of multiple RACH occasions may be transmitted via the control signal including the spatial relation configuration or via a RA-RNTI corresponding to a second random access message transmitted by the base station.

Some examples of the method, apparatuses, and non-transitory computer-readable medium described herein may further include operations, features, means, or instructions for receiving the random access message, in the form of a preamble random access message, during a RACH occasion, where the random access message includes a set of random access repetition messages and transmitting, to the UE, an indication of a repetition number corresponding to a specific one of the set of random access repetition messages on which reception of the random access message was via the transmit beam, where the indication of the repetition number may be transmitted via the control signal including the spatial relation configuration or via an RA-RNTI corresponding to a second random access message transmitted by the base station.

Some examples of the method, apparatuses, and non-transitory computer-readable medium described herein may further include operations, features, means, or instructions for receiving the random access message via a set of multiple segments of a RACH occasion and transmitting the control signal including the spatial relation configuration, where the spatial relation configuration indicates a segment of the set of multiple segments.

Some examples of the method, apparatuses, and non-transitory computer-readable medium described herein may further include operations, features, means, or instructions for receiving the random access message via an uplink channel, where the random access message includes a set of uplink channel repetitions of the random access message and transmitting the control signal including the spatial relation configuration, where the spatial relation configuration indicates an uplink channel repetition of the set of uplink channel repetitions.

Some examples of the method, apparatuses, and non-transitory computer-readable medium described herein may further include operations, features, means, or instructions for receiving, from the UE, a set of one or more other uplink signals using the transmit beam in accordance with the spatial relation configuration, where the set of one or more other uplink signals include PUSCH signals, or PUCCH signals, or SRSs not configured for beam management, or a combination thereof.

Some examples of the method, apparatuses, and non-transitory computer-readable medium described herein may further include operations, features, means, or instructions for transmitting, to the UE, an RRC configuration indicating the set of one or more other uplink signals.

Some examples of the method, apparatuses, and non-transitory computer-readable medium described herein may further include operations, features, means, or instructions for transmitting, to the UE, a second control signal that includes a second spatial relation configuration for transmission, by the UE, of a second set of one or more other uplink signals, the second spatial relation configuration indicating that transmission of the second set of one or more other uplink signals may be via a second transmit beam and receiving, from the UE, the second set of one or more other uplink signals using the second transmit beam in accordance with the second spatial relation configuration.

DETAILED DESCRIPTION

Figure 1:
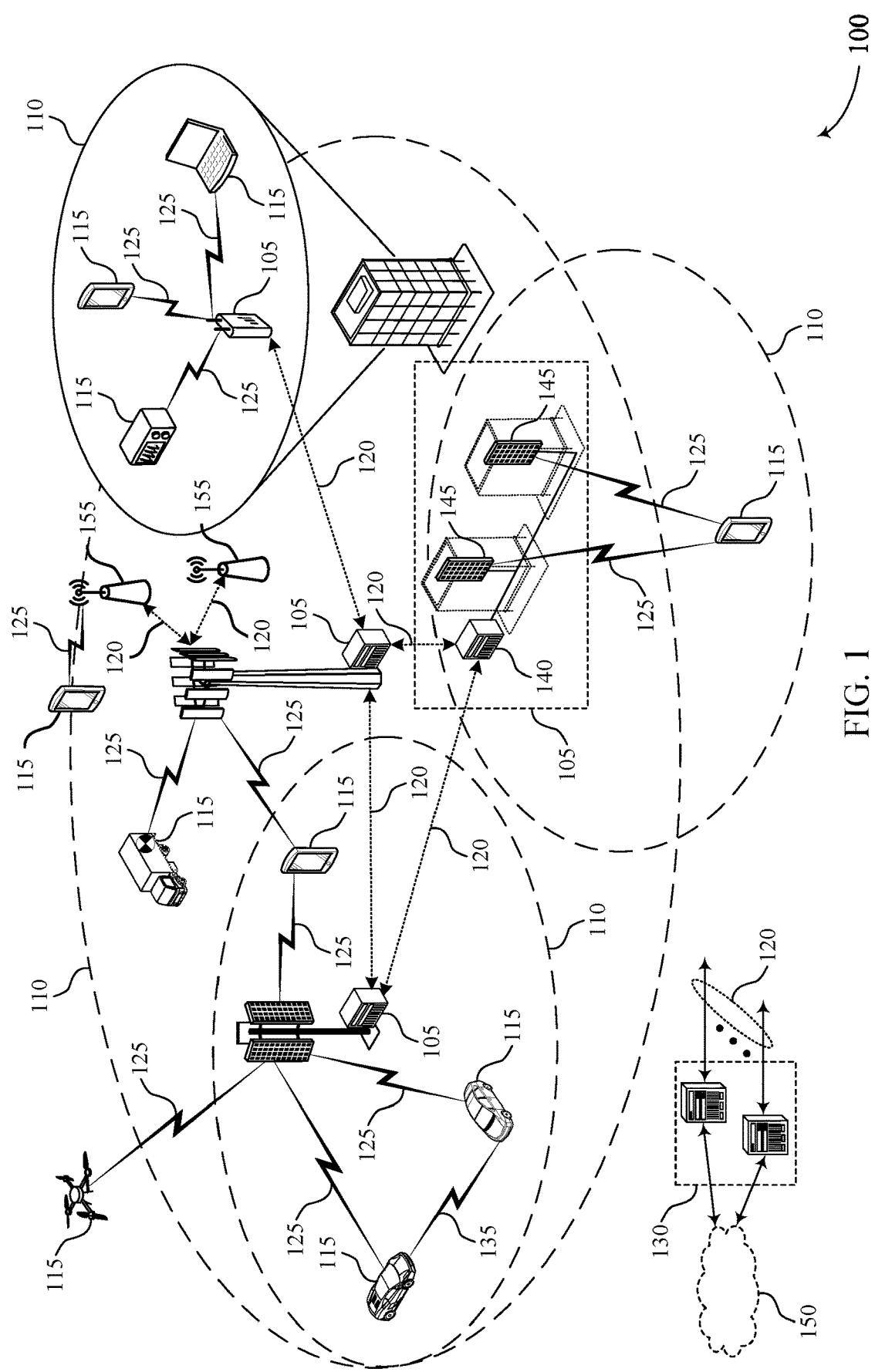
FIG. 1 illustrates an example of a wireless communications system that supports spatial relation information based on random access messages in accordance with aspects of the present disclosure.

In some wireless communications systems, a base station and a user equipment (UE) may perform uplink beam management to select a transmit beam for the UE to use for transmission of an uplink signal. In some examples, the base station may indicate a spatial domain transmission filter (e.g., a transmit beam) that is preferred by the base station by pointing to a downlink reference signal, such as a synchronization signal block (SSB) or a channel state information reference signal (CSI-RS) that was received by the UE using the same spatial domain transmission filter. However, if there is not correspondence between uplink and downlink beams at the UE, the base station may not point to a downlink reference signal. Uplink and downlink beam correspondence may not be assumed if a transmit beam used for transmission of an uplink signal is in a direction different than a receive beam used for reception of a downlink signal by the UE. For example, if the UE communicates with the base station via an uplink dense deployment system, the UE may transmit uplink communications to one or more uplink nodes that may forward the uplink communications to the base station (e.g., over backhaul), and the UE may receive downlink communications directly from the base station. In another example, the UE may be configured with two or more uplink carriers than may correspond to transmit beams in different directions. In such cases, the UE may not assume beam correspondence between the uplink and downlink.

If the UE has established a radio resource control (RRC) connection with the network, the base station may point to previous uplink transmissions by the UE, such as sounding reference signal (SRS) transmissions, for transmit beam identification. The UE may use a same transmit beam for transmission of uplink signals as a transmit beam used for transmitting the indicated uplink transmission. However, the base station may not indicate some types of uplink messages for transmit beam identification. For example, some control signaling, such as a spatial relation information element (IE) may not be configured to convey an identifier (ID) of other uplink messages, such as random access messages.

As described herein, the base station may indicate an uplink random access message previously transmitted by the UE during a random access procedure for transmit beam identification. By referring to a random access message, the base station may configure the UE to use a transmit beam preferred by the base station for transmission of uplink signals during early initial access (e.g., shortly after a random access procedure) without uplink and downlink beam correspondence. In one example, the base station may transmit a spatial relation IE including a field that identifies the previous uplink random access message and indicates that the corresponding transmit beam is to be used. If the UE receives the IE indicating an ID of a random access message previously transmitted by the UE, the UE will use the spatial relation information (e.g., a transmission configuration indicator (TCI) state, a spatial domain transmission filter, a transmit beam, or any combination thereof) corresponding to the random access message to transmit an uplink signal such as an SRS, a physical uplink control channel (PUCCH) signal, a physical uplink shared channel (PUSCH) signal, or another random access channel (RACH) signal. The ID of the random access message indicated by the spatial relation IE may correspond to a RACH occasion, a repetition number of a RACH repetition message, a segment of a RACH occasion, a PUSCH repetition of a random access message transmitted by the UE, a reference signal transmitted by the UE during the random access procedure, or any combination thereof.

In some examples, the UE may use the indicated transmit beam for transmission of subsequent uplink signals until the base station configures the UE with spatial relation information for a target uplink channel or reference signal. For example, during early initial access after the UE and base station perform the random access procedure, the UE may not be configured with spatial relation information for transmitting uplink signals. As such, the UE may use the indicated transmit beam corresponding to a random access message until the UE is configured with spatial relation information.

Aspects of the disclosure are initially described in the context of wireless communications systems. Additional aspects of the disclosure are described with reference to transmit beam selection timelines. Aspects of the disclosure are further illustrated by and described with reference to apparatus diagrams, system diagrams, and flowcharts that relate to spatial relation information based on random access messages.

FIG. 1 illustrates an example of a wireless communications system 100 that supports spatial relation information based on random access messages in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may perform a random access procedure with a base station 105 to establish a communication link 125 and synchronize with the network. The UE 115 may transmit one or more uplink random access messages to the base station 105 during the random access procedure. For example, the UE 115 may transmit a random access preamble (e.g., Msg 1) and a subsequent random access message (e.g., Msg 3) via a physical uplink shared channel (PUSCH), or some other uplink channel. In the example of a two-step random access procedure, the UE 115 may transmit one random access message, which may include a preamble and a payload (e.g., Msg A). The UE 115 may receive an SSB from the base station 105 prior to the random access procedure, and the UE 115 may use a same spatial domain transmission filter (e.g., transmit beam) used for receipt of the corresponding SSB (e.g., a reception beam) for transmission of the uplink random access message(s). In some examples, a set of rules and configurations may define a mapping (e.g., a one-to-one mapping) between SSBs and random access occasions (e.g., random access channel (RACH) occasions).

After a connection is established between the UE 115 and the base station 105, the base station 105 may schedule one or more uplink transmissions by the UE 115 (e.g., via control signaling such as RRC signaling, a medium access control (MAC) control element (CE), or downlink control information (DCI)). The base station 105 may configure the UE 115 with an uplink beam to use for the uplink transmissions (e.g., SRS, PUSCH, or PUCCH transmissions) by referring, in the control signaling scheduling the transmission, to a reference signal previously received or transmitted by the UE 115. In one example, the base station 105 may transmit RRC signaling or a MAC-CE that configures a spatial relation IE that refers to an SSB index or a CSI-RS resource ID (e.g., PUCCH-SpatialRelationInfo). The UE 115 may receive the IE and transmit the scheduled target SRS resource or other uplink signal using the same spatial domain transmission filter used for the reception of the indicated CSI-RS or SSB (e.g., a physical broadcast channel (PBCH) block). Additionally or alternatively, the base station 105 may transmit a spatial relation IE that points to an SRS resource ID (e.g., SRS-SpatialRelationInfo). The UE 115 may receive the IE and transmit the target SRS resource or other uplink signal using the same spatial domain transmission filter used for the transmission of the indicated SRS (e.g., a reference periodic SRS that was previously transmitted by the UE 115). In some examples, the base station 105 may schedule the transmission of the uplink signal via DCI, and the DCI may indicate an ID of the random access message for the spatial relation IE included in the RRC signal or MAC-CE. The base station 105 may additionally or alternatively transmit a TCI state (e.g., instead of a spatial relation IE) to the UE 115. The TCI state may point to a downlink reference signal such as an SSB or a CSI-RS or an uplink reference signal such as an SRS. The TCI state may be configured as an uplink TCI state or a joint downlink and uplink TCI state.

In some examples, the wireless communications system 100 may include one or more uplink nodes 155. The uplink nodes 155 may represent uplink receive points that are configured for reception of uplink transmissions from UEs 115 (e.g., via a communication link 125), but may not be configured for transmission of downlink transmissions to the UEs 115. The uplink nodes 155 may communicate or forward received uplink transmissions to an associated base station 105, such as via a backhaul link 120. The base station 105 may represent an example of a macro node (e.g., a central node or a serving cell). The deployment of the uplink nodes 155 may be referred to as an uplink dense deployment. In some cases, a UE 115 and a base station 105 may communicate in the uplink via an SUL carrier. In cases where the UE 115 communicates with the base station 105 in the uplink via an uplink node 155 or via an SUL carrier, uplink transmit and receive beams for the SUL carrier or the uplink node 155 may not be associated with any corresponding downlink beams (e.g., beam correspondence may not be assumed).

The base station 105 may not point to a downlink reference signal, such as an SSB or CSI-RS to indicate an uplink beam for the UE 115 to use if beam correspondence between the uplink and the downlink cannot be assumed, because the uplink and downlink beams may not correspond to each other in these communication scenarios. Instead, the base station 105 may point to previously transmitted uplink signals. However, in some cases, such as during early initial access (e.g., during a random access procedure or shortly after a random access procedure is performed), the UE 115 may not have transmitted some uplink signals yet, such as SRSs. Accordingly, it may be beneficial for the base station 105 to point to other uplink signals, messages, or channels, such as random access messages. Some signaling, such as some spatial relation IEs, may not be configured to indicate other uplink messages (e.g., random access messages) as references for transmit beam identification.

As described herein, the base station 105 may transmit a spatial relation configuration to the UE 115 to indicate that transmission of a scheduled uplink signal may be via a transmit beam used in transmitting a random access message. In other words, the base station 105 may indicate an uplink message as a reference for transmit beam identification. In some examples, the spatial relation configuration may be transmitted via a spatial relation IE that includes a field for identifying a random access message. The UE 115 may receive the spatial relation configuration and determine to transmit the corresponding uplink signal using the same spatial domain transmission filter (e.g., transmit beam) used for transmitting the identified random access message. The spatial relation IE may indicate a RACH occasion, a RACH repetition number, a segment of a RACH occasion, a PUSCH repetition of a random access message, a reference signal used by the UE 115 during the random access procedure, or any other uplink signal or channel transmitted during a random access procedure. In some examples, the UE 115 may use the indicated transmit beam for one or more subsequent uplink transmissions (e.g., until the base station 105 configures other spatial relation information for the UE 115). As such, the UE 115 and the base station 105 may perform uplink beam management during early initial access based on one or more uplink random access messages.

Figure 2:
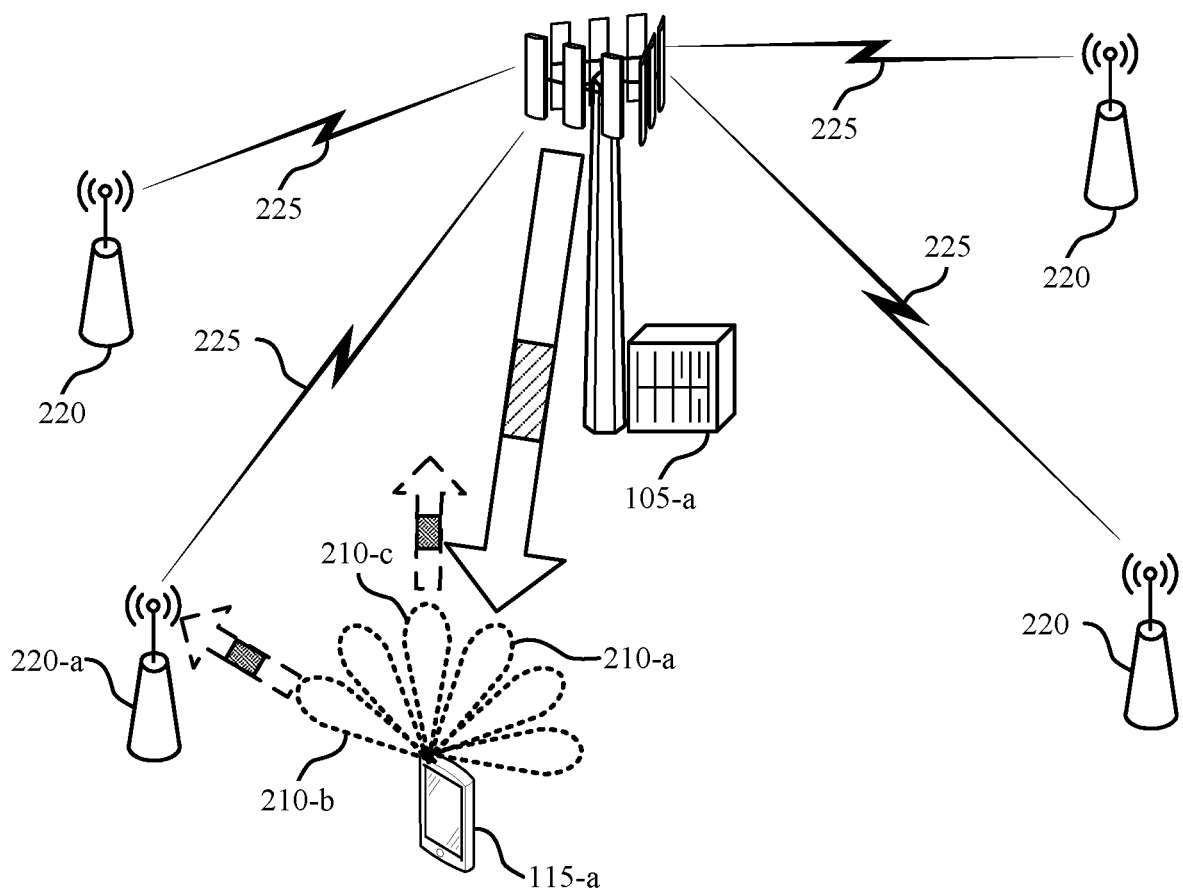
FIG. 2 illustrates an example of a wireless communications system that supports spatial relation information based on random access messages in accordance with aspects of the present disclosure.

FIG. 2 illustrates an example of a wireless communications system 200 that supports spatial relation information based on random access messages in accordance with aspects of the present disclosure. In some examples, the wireless communications system 200 may implement some aspects of wireless communications system 100. For example, wireless communications system 200 may include a UE 115-a and a base station 105-a, which may be examples of the corresponding devices as described with reference to FIG. 1. In some cases, the wireless communications system 200 may also include one or more uplink nodes 220, which may be examples of an uplink node 155 described with reference to FIG. 1.

As described with reference to FIG. 1, the UE 115-a and the base station 105-a may communicate using one or more beams 210 (e.g., communication beams 210, shaped using beamforming techniques). For example, for uplink communications, the UE 115-a may use a transmit beam 210 (e.g., an uplink transmit beam 210) for transmitting the uplink transmissions 215 including information or data to the base station 105-a, and the base station 105-a may use a receive beam 210 (e.g., an uplink receive beam 210) to receive the transmitted information or data.

In some cases, the UE 115-a and the base station 105-a may communicate in the uplink via one or more uplink nodes 220 (e.g., in an uplink dense deployment scenario). In such cases, the UE 115-a may transmit uplink transmissions 215, such as uplink signals and/or channels, to an uplink receive point, which may be represented by an uplink node 220 (e.g., the uplink node 220-a). The uplink nodes 220 may be connected to the base station 105-a (e.g., a macro node) via backhaul links 225 (e.g., wired or wireless links, which may be examples of a backhaul link 120 described with reference to FIG. 1), such that one or more uplink nodes 220 may receive the uplink transmissions 215 from the UE 115-a and forward associated uplink data or uplink information to the base station 105-a (e.g., transmit an indication of the uplink data or information, such as via the backhaul link 225). Downlink signals and/or channels may be transmitted to the UE 115-a from the base station 105-a (e.g., a macro node, serving cell, serving base station 105), which may represent a different communication node (e.g., at a different location) than any uplink nodes 220 used for uplink communications.

The uplink dense deployment scenario as described herein may improve coverage and/or capacity. For example, using one or more uplink nodes 220 for communications between the UE 115-a and the base station 105-a may reduce uplink pathloss (e.g., among other examples). The reduction in pathloss may increase uplink communication speed and throughput, which may in turn reduce a bottlenecking effect for the uplink communications (e.g., as compared to downlink communications). Additionally or alternatively, uplink dense deployment may reduce deployment cost and/or complexity for network entities (e.g., for the uplink nodes 220), while increasing coverage, because the uplink nodes 220 may not be configured to transmit downlink signals or perform configurations. For example, each uplink node 220 may be configured to receive uplink signals (e.g., from the UE 115-*a*) and send the uplink signals to the base station 105-*a* (e.g., with or without some processing).

In some examples, the UE 115-*a* may be configured with two or more uplink carriers and a single downlink carrier for a same serving cell (e.g., for communications with the base station 105-*a* within the geographic coverage area 110-*a*). That is, the UE 115-*a* may be configured with a supplementary uplink (SUL) carrier and a non-SUL or normal uplink (NUL) carrier for communications with the base station 105-*a*. The UE 115-*a* may transmit the uplink transmissions 215 via the SUL carrier, the non-SUL carrier, or both. The uplink transmissions 215 on the SUL carrier may not be simultaneous with the uplink transmissions 215 on the non-SUL carrier by the UE 115-*a*. In one example, the UE 115-*a* may be configured with a TDD band (e.g., TDD uplink carrier) and a SUL carrier, such that the UE 115-*a* may transmit the uplink transmissions 215 on either the TDD band (e.g., non-SUL or NUL carrier) or on the SUL carrier. The SUL carrier or the non-SUL carrier may convey uplink messages to an uplink node 220, to the base station 105-*a*, or some other node. That is, an uplink beam used for transmission of one or more of the uplink transmissions 215 may or may not be in the same direction as a receive beam used for reception of a downlink message from the base station 105-*a*.

In cases where the UE 115-*a* communicates with the base station 105-*a* in the uplink via an uplink node 220 (e.g., the uplink node 220-*a*), uplink transmit and receive beams 210 may be associated with the uplink node 220 (e.g., and not with the base station 105-*a*). Similarly, in cases where the UE 115-*a* communicates with the base station 105-*a* using an SUL carrier, uplink transmit and receive beams 210 for the SUL carrier may not be associated with any corresponding beams 210 for the associated downlink carrier. As such, when the UE 115-*a* communicates in the uplink via an uplink node 220, or via an SUL carrier, a beam correspondence may not exist between downlink and uplink beams 210 (e.g., for use in uplink beam management). A downlink reference signal (e.g., CSI-RS and/or SSB) may therefore not be used to indicate an uplink beam 210 (e.g., via spatial relation information), for example, because the uplink and downlink beams 210 may not correspond to each other in these communication scenarios.

In some cases, if there is not correspondence between the uplink and downlink beams 210, the UE 115-*a* may transmit one or more SRSs (e.g., SRSs for beam management) to perform uplink beam management. The UE 115-*a* may transmit different SRS resources using a set of different transmit beams 210, such as the transmit beams 210-*a*, 210-*b*, and 210-*c* (e.g., the UE 115-*a* may select the transmit beams 210). The base station 105-*a* may receive the SRSs and select, from the set of transmit beams 210, an uplink receive beam 210 that is preferred by the base station 105-*a*. The base station 105-*a* may indicate the selected beam 210 to the UE 115-*a*. However, the UE 115-*a* may not perform uplink beam management using SRSs if the UE 115-*a* is not in an RRC connected state, such as during early initial access (e.g., during a random access procedure). For example, during initial access, the UE 115-*a* may not have transmitted SRSs or other uplink signals yet for the base station 105-*a* to reference for transmit beam identification.

In some cases, uplink beam management during a random access procedure, initial access, or both, may be performed by the UE 115-*a*, or the base station 105-*a*, or both. In one example, the UE 115-*a* may perform PRACH repetition (e.g., repetition of Msg1 or MsgA-preamble) using different uplink spatial filters across multiple RACH occasions to identify a transmit beam 210. In another example, the UE 115-*a* may perform uplink beam sweeping within a RACH occasion, where the RACH occasion is divided into two or more segments (e.g., a RACH format spanning M symbols may be divided into a first segment of N symbols and a second segment of N symbols). The UE 115-*a* may use a different transmit beam 210 to transmit each respective segment of the RACH occasion. Additionally or alternatively, the UE 115-*a* may perform PUSCH repetition (e.g., repetition of Msg3 or MsgA-payload) using a different spatial filter for each repetition. In each example, the selection of the transmit beam(s) 210 may be up to the UE 115-*a*. The base station 105-*a* may perform receive beam sweeping to adjust an uplink receive beam 210, and the transmit beam 210 may be selected accordingly. However, signaling to indicate the transmit beam 210 that is preferred by the base station 105-*a* may not be defined. Some control signaling, such as some spatial relation IEs, may not be configured to indicate other uplink transmissions 215 (e.g., uplink messages different than SRSs or other uplink reference signals), such as random access messages for transmit beam identification.

As described herein, the base station 105-*a* may indicate a random access message for transmit beam identification (e.g., during early initial access). That is, the base station 105-*a* may transmit a control signal 205 that includes a spatial relation configuration for the UE 115-*a*, and the spatial relation configuration may point to a transmit beam 210 used for transmission of a random access preamble, a RACH, a RACH occasion, a reference signal used by the UE 115-*a* during a random access procedure, or any other random access message. The spatial relation IE may include a field to convey an ID of the random access message. In some examples, the control signal 205 may schedule an uplink transmission 215 by the UE 115-*a*. For example, the base station 105-*a* may transmit an RRC signal, a MAC-CE, DCI, or some other control signal 205 to trigger an uplink transmission 215 by the UE 115-*a* using the indicated transmit beam 210. If the control signal 205 is an RRC signal or a MAC-CE, the control signal 205 may configure the spatial relation IE to refer to an ID of the previously transmitted random access message. If the control signal 205 is DCI, the control signal 205 may point to an ID of the random access message for the spatial relation IE.

Accordingly, the control signal 205 may indicate that the UE 115-*a* is to transmit the uplink signal via a transmit beam 210 used in transmitting the random access message. The random access message indicated in the spatial relation IE may be an example of a random access preamble, a PUSCH signal, a reference signal used by the UE 115-*a* during the random access procedure (e.g., a DMRS), or some other random access message. The UE 115-*a* may select the transmit beam 210 used for transmission of the indicated random access message to transmit one or more scheduled uplink signals, such as SRSs, PUCCH transmissions, DG or CG PUSCH transmissions, PRACH transmissions (e.g., a subsequent PRACH message transmitted by the UE 115-*a* in an RRC connected state), or any combination thereof.

The spatial relation information IE as described herein (e.g., SpatialRelationInfo) may convey a spatial relation information ID (e.g., a SpatialRelationInfoId parameter), a serving cell index (e.g., a ServingCellId parameter), a reference signal indicated by the spatial relation information (e.g., one or more referenceSignal parameters), or any combination thereof. The reference signal field may indicate an index or ID of a reference signal previously transmitted or received by the UE 115-*a*. For example, the reference signal field may indicate one of an SSB index, a CSI-RS index, an SRS resource ID, or any combination thereof. As described herein, the reference signal field may additionally or alternatively indicate an ID of a random access message (e.g., a random-access parameter than may indicate a RACH, PUSCH, reference signal, or other random access message). Accordingly, in some examples, the reference signal field of a spatial relation IE may covey a choice between: ssb-Index, CSI-RS-Index, srs, and random-access parameters.

A UE 115 and a base station 105 may thereby perform uplink beam management during a random access procedure, early initial access, or both, which may reduce latency, improve reliability of the communications, and improve coordination between devices. The base station 105 may transmit a control signal 205 to the UE 115 to indicate an ID of a random access message for transmit beam identification, and the UE 115 may be configured to transmit an uplink signal using a same transmit beam 210 used for transmission of the indicated random access message in response to the control signal.

Figure 3:
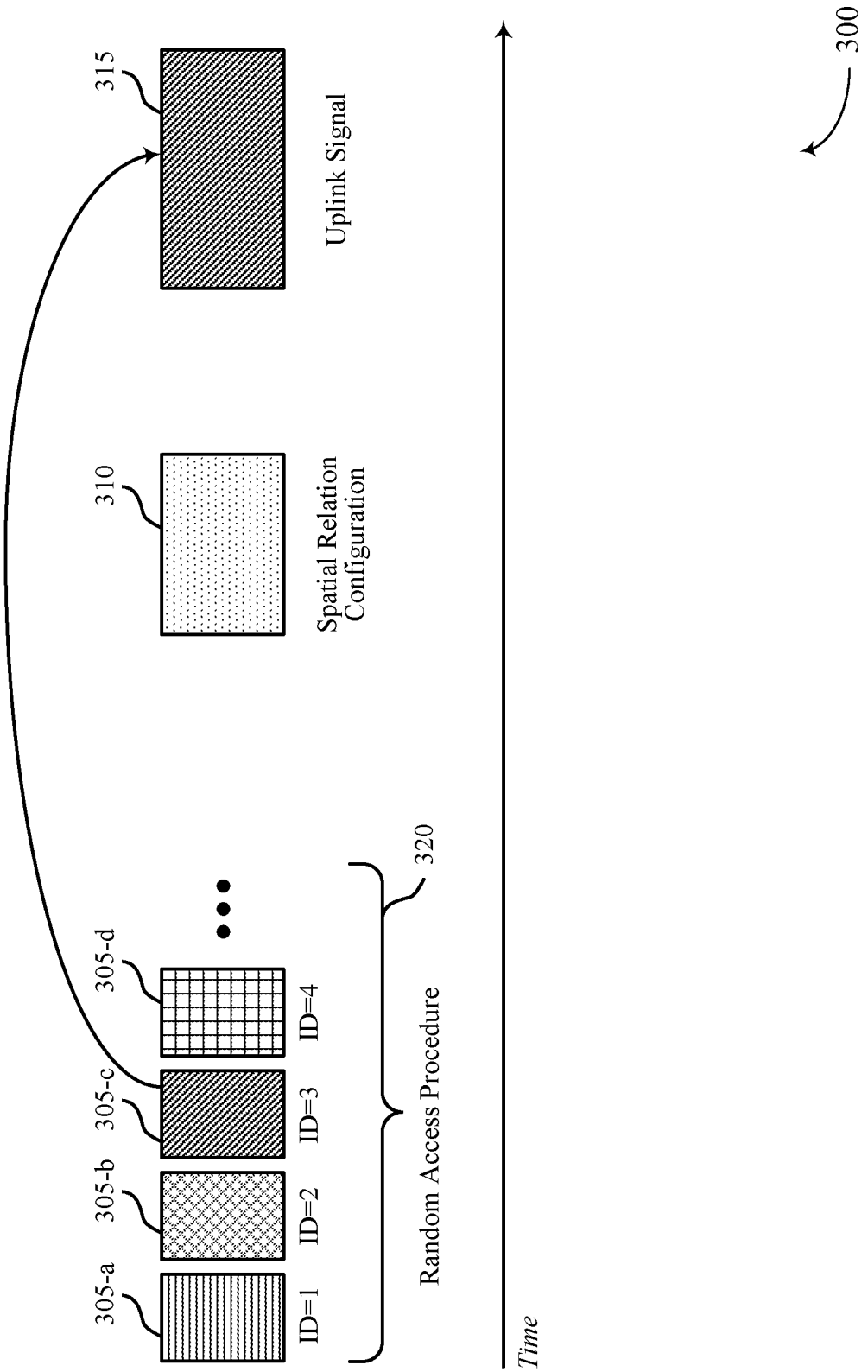
FIG. 3 illustrates an example of a transmit beam selection timeline that supports spatial relation information based on random access messages in accordance with aspects of the present disclosure.

FIG. 3 illustrates an example of a transmit beam selection timeline 300 that supports spatial relation information based on random access messages in accordance with aspects of the present disclosure. The transmit beam selection timeline 300 may implement or be implemented by some aspects of the wireless communications systems 100 or 200. For example, the transmit beam selection timeline 300 may illustrate an example timeline for uplink beam management during initial access performed by a UE 115 and a base station 105, which may represent examples of a UE 115 and a base station 105 as described with reference to FIGS. 1 and 2. The UE 115 may receive a spatial relation configuration 310 for transmission, by the UE 115, of an uplink signal 315. In some examples, the spatial relation configuration 310 may indicate that transmission of the uplink signal 315 is via a transmit beam used in transmitting a random access message 305.

The UE 115 and the base station 105 may perform a random access procedure 320, as described with reference to FIGS. 1 and 2. During the random access procedure 320, the UE 115 may transmit and receive one or more random access messages 305 (e.g., the random access messages 305-a, 305-b, 305-c, and 305-d). The random access messages 305 transmitted by the UE 115 may include a random access preamble message (e.g., Msg1 transmitted via a PRACH), a PUSCH message (e.g., Msg3), a reference signal used by the UE 115 during the random access procedure (e.g., a DMRS), or other uplink random access messages 305. In the example of a two-step random access procedure, the UE 115 may transmit a random access preamble and payload in a single random access message 305 (e.g., MsgA). The UE 115 may additionally or alternatively receive one or more downlink random access messages 305 from the base station 105, such as a random access response message (e.g., Msg2, Msg4, or MsgB).

Each random access message 305 may be identified by a respective ID. For example, the random access message 305-a may be identified by the ID=1. In some examples, a portion of the random access message 305 or another uplink signal may be identified, such as a RACH occasion (e.g., if the random access message 305 is transmitted during one or more RACH occasions), a repetition number corresponding to a random access repetition message, a segment of a RACH occasion (e.g., if the random access message 305 is transmitted via one or more segments of the RACH occasion), a PUSCH repetition (e.g., if the random access message 305 includes multiple PUSCH repetitions), a channel used for transmission of the random access message 305, a reference signal transmitted during random access, or any combination thereof.

As described with reference to FIG. 2, the UE 115 and the base station 105 may perform uplink beam management during the random access procedure 320, during initial access, or both to select a transmit beam for the UE 115 to use for transmission of one or more uplink signals 315. The uplink beam management procedure may include transmit beam sweeping by the UE 115, receive beam sweeping by the base station 105, or both. As described herein, the UE 115 may perform transmit beam sweeping during the random access procedure 320. For example, the UE 115 may transmit a random access message 305 (e.g., a preamble random access message 305) during multiple RACH occasions, and the UE 115 may use different uplink spatial filters for transmission of each RACH occasion. In another example, a random access message 305 (e.g., a preamble random access message) may include multiple random access repetition messages across multiple RACH occasions (e.g., Msg1 or MsgA-preamble repetition via RACH resources). In some examples, the UE 115 may perform uplink beam sweeping during transmission of a random access message 305 within a single RACH occasion. The RACH occasion may be divided into multiple segments, and the UE 115 may use a different transmit beam for transmission of each segment. In another example, the UE 115 may transmit a random access message 305 via a PUSCH, and the random access message 305 may include a set of PUSCH repetitions of the random access message 305. Each PUSCH repetition may be transmitted using a different spatial filter (e.g., Msg3 or MsgA-payload repetition via PUSCH resources). In each example, the base station 105 may perform receive beam sweeping to adjust a receive beam. A transmit beam for transmission of a subsequent uplink signal 315 may be selected accordingly.

As described herein, the base station 105 may transmit a control signal that includes the spatial relation configuration 310 for transmission, by the UE 115, of the uplink signal 315. The spatial relation configuration 310 may indicate that transmission of the uplink signal 315 is via a transmit beam used in transmitting a random access message 305. That is, the spatial relation configuration 310 may refer to a selected transmit beam (e.g., a spatial domain transmission filter that is preferred by the base station 105) after performing uplink beam management during the random access procedure 320. The control signal may be an RRC signal or a MAC-CE that configures the spatial relation configuration 310 as a spatial relation IE. The spatial relation IE may include a field configured to refer to an ID of one of the random access messages 305 previously transmitted by the UE 115. Additionally or alternatively, the base station 105 may transmit a second control signal that may be a DCI signal that schedules the uplink signal 315. The DCI signal may indicate an ID of the random access message 305 for the spatial relation IE.

The spatial relation configuration 310 may indicate that transmission of the uplink signal 315 is via the transmit beam used in transmitting the identified random access message 305. In the example of the transmit beam selection timeline 300, the base station 105 may determine the transmit beam used for transmission of the random access message 305-c is preferred over other transmit beams used by the UE 115 during the random access procedure 320. The base station 105 may transmit the spatial relation configuration 310, another control signal, or both, to schedule the uplink signal 315 and to identify the random access message 305-c (e.g., the spatial relation configuration 310 may indicate the ID=3). The control signal may trigger transmission of the uplink signal 315 by the UE 115. The UE 115 may identify the spatial relation configuration 310 (e.g., a spatial relation IE conveyed via the control signal) and the random access message 305-c indicated by the spatial relation configuration 310. The UE 115 may transmit the uplink signal 315 using the transmit beam used for transmission of the indicated random access message 305-c in accordance with the spatial relation configuration 310.

In some examples, the UE 115 may transmit one or more of the random access messages 305-a, 305-b, 305-c, and 305-d as a preamble random access message 305 during each of a set of RACH occasions. The UE 115 may use a different transmit beam for transmission of each RACH occasion. In such cases, the spatial relation configuration 310 may indicate one of the set of RACH occasions included in the transmission of the random access message. The UE 115 may determine to transmit the uplink signal 315 using a same transmit beam as the transmit beam used for transmission of the identified RACH occasion. The UE 115 may transmit the uplink signal 315 using a same transmit beam used for transmission of the identified RACH occasion.

In some examples, the UE 115 may perform RACH repetition. That is, one or more of the random access messages 305-a, 305-b, 305-c, and 305-d may, in some examples, be transmitted as a preamble random access message during a RACH occasion, and each random access message 305 may include a set of random access repetition messages (e.g., a PRACH repetition of a Msg1 or MsgA). The UE 115 may transmit each random access repetition message using a different uplink spatial filter. Each random access message may correspond to a respective random access repetition number. In such cases, the spatial relation configuration 310 may indicate to a repetition number of one of the random access repetition messages within the random access message 305. In some examples, the control signal may point to the random access message 305, and the spatial relation IE or a second control signal may indicate the random access repetition number. The UE 115 may transmit the uplink signal 315 using the same transmit beam used for transmission of the identified random access repetition message.

In some examples, the base station 105 may not explicitly indicate the RACH occasion or repetition number via the spatial relation configuration 310. Instead, the base station 105 may indicate the RACH occasion or repetition number via a corresponding random access (RA) radio network temporary identifier (RNTI) (e.g., an implicit indication). In such cases, the control signal, the spatial relation configuration 310, or both, may indicate the RA-RNTI to the UE 115, and the UE 115 may use the indicated RA-RNTI to identify the corresponding RACH occasion or random access repetition number. The RA-RNTI may correspond to a random access message 305 that is received by the UE 115 (e.g., Msg2). A calculation for the RA-RNTI may indicate the RACH occasion and the repetition number. For example, the UE 115 may identify the RACH occasion or the repetition number based on Equation 1 for the RA-RNTI. In some examples, such as during a two-step random access procedure 320, the UE 115 may use a MSGB-RNTI, and the UE 115 may identify the RACH occasion or the repetition number based on Equation 2 for the MSGB-RNTI.

$$\text{RA-RNTI} = 1 + s\_id + 14 \times t\_id + 14 \times 80 \times f\_id + 14 \times 80 \times 8 \times \text{ul\_carrier\_id} \quad \text{Equation (1)}$$

$$\text{MSGB-RNTI} = 1 + s\_id + 14 \times t\_id + 14 \times 80 \times f\_id + 14 \times 80 \times 8 \times \text{ul\_carrier\_id} + 14 \times 80 \times 8 \times 2 \quad \text{Equation (2)}$$

In the example of the Equations 1 and 2, the symbol s_id may indicate an index of a first symbol of a PRACH occasion. The symbol t_id may indicate an index of a first slot of the PRACH occasion in a system frame. The symbol f_id may indicate an index of the PRACH occasion in a frequency domain. The symbol ul_carrier_id may indicate an uplink carrier used for a random access preamble transmission (e.g., a preamble random access message 305). Accordingly, Equations 1 and 2 may represent examples of equations the UE 115 may use to identify the RACH occasion or a random access repetition number based on an indicated RNTI.

In some examples, the UE 115 may perform uplink beam sweeping within a RACH occasion. That is, the UE 115 may transmit a random access message 305 via multiple segments of a RACH occasion, and the UE 115 may use a different transmit beam to transmit each segment. The spatial relation configuration 310 may point to a segment of the multiple segments of a RACH occasion. In some examples, the control signal may identify the RACH occasion or the random access message 305, and the spatial relation configuration 310 may indicate the selected segment. The UE 115 may transmit the uplink signal 315 using a same transmit beam as a transmit beam used to transmit the identified segment of the RACH occasion based on the spatial relation configuration.

In some examples, the UE 115 may perform uplink beam sweeping across PUSCH repetitions of a random access message 305 (e.g., Msg3 or MsgA-payload repetitions). The UE 115 may transmit a random access message 305 via an uplink channel (e.g., a PUSCH), and the random access message may include a set of PUSCH repetitions of the random access message 305. The UE 115 may use a different transmit beam for transmission of each PUSCH repetition. The spatial relation configuration 310 may point to a PUSCH repetition of the set of PUSCH repetitions. The UE 115 may transmit the uplink signal 315 (e.g., a target uplink channel or reference signal) using a same transmit beam as the transmit beam used for transmission of the identified PUSCH repetition (e.g., and for transmission of a corresponding DMRS).

In some examples, the base station 105 may transmit the spatial relation configuration 310 during the random access procedure 320. For example, if the UE 115 performs uplink beam sweeping during transmission of a first random access message 305 (e.g., Msg1), the base station 105 may transmit the spatial relation configuration 310 to indicate the ID of the first random access message 305, a RACH occasion corresponding to the first random access message 305, a RACH repetition number associated with the first random access message 305, a MsgB-RNTI indicating a RACH occasion or repetition number associated with the first random access message 305, or any combination thereof. The UE 115 may use the same transmit beam used for transmission of the indicated random access message 305 (e.g., or portion of the random access message 305) to transmit a subsequent random access message 305 (e.g., Msg3) during the random access procedure 320.

A UE 115 and a base station 105 as described herein may thereby perform uplink beam management and transmit beam identification during a random access procedure 320, initial access, or both, according to the transmit beam selection timeline 300 to reduce latency and improve coordination between devices. The base station 105 may transmit the spatial relation configuration 310 to indicate that the UE 115 is to transmit an uplink signal 315 using a same transmit beam as a transmit beam used for a previous transmission of a random access message. Accordingly, the UE 115 may transmit an uplink signal 315 during early initial access using a transmit beam that is preferred by the base station 105, which may improve communication reliability and coordination between the UE 115 and the base station 105.

Figure 4:
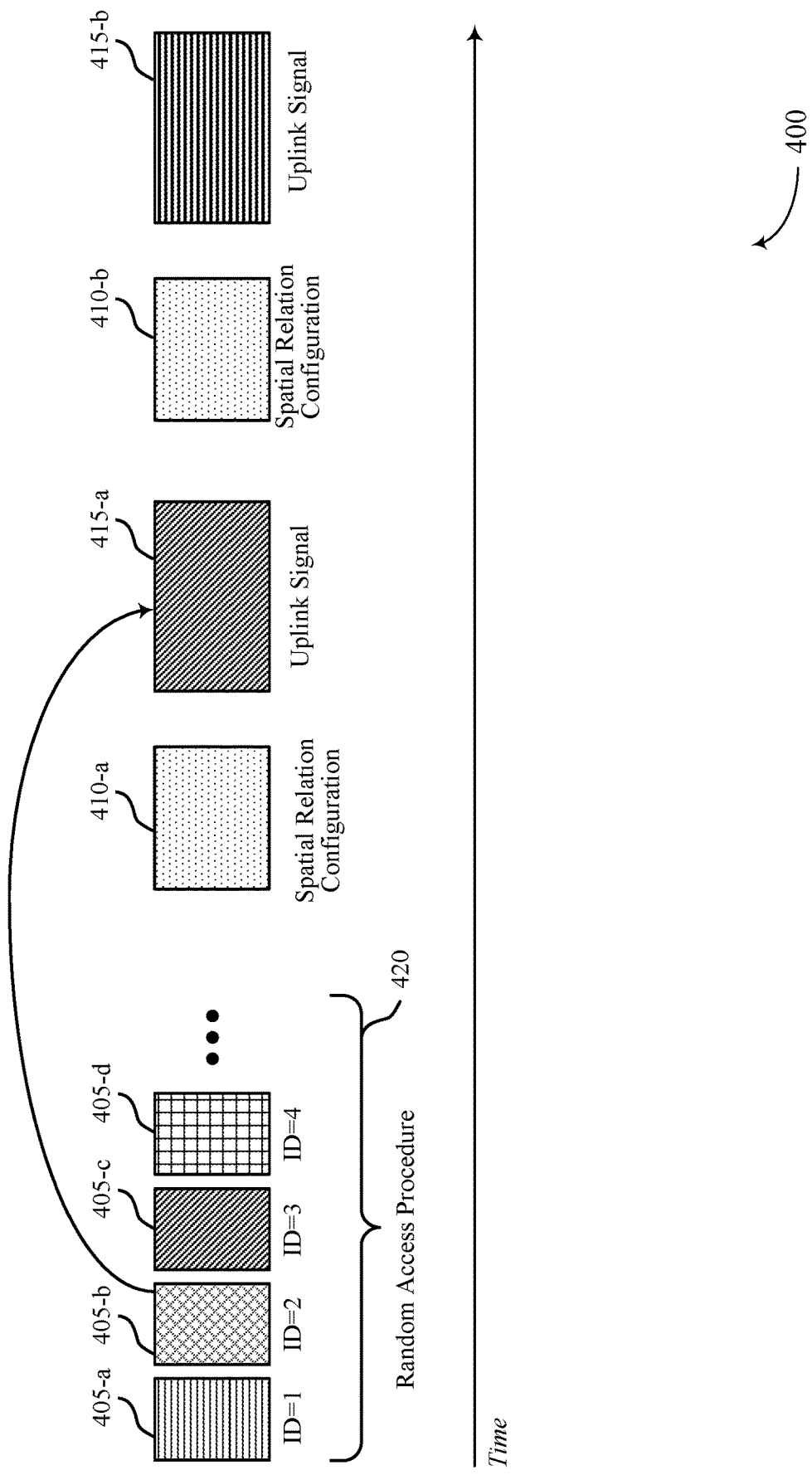
FIG. 4 illustrates an example of a transmit beam selection timeline that supports spatial relation information based on random access messages in accordance with aspects of the present disclosure.

FIG. 4 illustrates an example of a transmit beam selection timeline 400 that supports spatial relation information based on random access messages in accordance with aspects of the present disclosure. The transmit beam selection timeline 400 may implement or be implemented by some aspects of the wireless communications systems 100 or 200 or the transmit beam selection timeline 300. For example, the transmit beam selection timeline 400 may illustrate an example timeline for uplink beam management and transmit beam selection by a UE 115 and a base station 105, which may represent examples of a UE 115 and a base station 105 as described with reference to FIGS. 1-3. The UE 115 may receive one or more spatial relation configurations 410 for transmission, by the UE 115, of one or more corresponding uplink signals 415. In some examples, the spatial relation configuration 410 may indicate that transmission of an uplink signal 415 is via a transmit beam used in transmitting a random access message 405.

The transmit beam selection timeline 400 may represent an example of the transmit beam selection timeline 300 as described with reference to FIG. 3. For example, the transmit beam selection timeline 400 illustrates a random access procedure 420 performed between a UE 115 and a base station 105, which may be an example of the random access procedure 320 described with respect to FIG. 3. During the random access procedure 420, the UE 115 may receive, transmit, or both one or more random access messages 405 (e.g., the random access messages 405-a, 405-b, 405-c, and 405-d). As described with reference to FIG. 3, the UE 115 may perform uplink beam sweeping while transmitting the random access messages 405, and the base station 105 may perform receive beam sweeping to identify a preferred transmit beam.

In some cases, the selection of the transmit beam may occur during the random access procedure 420. If the UE 115 performs uplink beam sweeping in a preamble random access message 405 (e.g., Msg1), the base station 105 may indicate a selected transmit beam in a subsequent downlink random access message 405 (e.g., Msg2), and the UE 115 may transmit a random access message 405 via a PUSCH (e.g., Msg3) using the indicated transmit beam. In some examples, the downlink random access message 405 may include CRC information scrambled by an RA-RNTI, and the RA-RNTI may identify a RACH occasion or repetition number corresponding to the selected transmit beam, as described with reference to FIG. 3. In such cases, subsequent uplinks signals 415 transmitted after the random access procedure 420 (e.g., SRSs, PUSCH signals, PUCCH signals, or the like) that are not configured or indicated with spatial relation information may follow the transmit beam used for the latest uplink transmission during initial access (e.g., the transmit beam used for the Msg3 PUSCH transmission).

In the example of the transmit beam selection timeline 400, the base station 105 may transmit a control signal including the spatial relation configuration 410-a after the random access procedure 420. The spatial relation configuration 410-a may indicate a selected transmit beam by conveying an ID of the corresponding random access message 405-b (e.g., ID=2). The UE 115 may transmit the uplink signal 415-a using the same transmit beam as the transmit beam used for transmission of the random access message 405-b. In some examples, the UE 115 may transmit a set of one or more other uplink signals 415 after performing the random access procedure 420 using the transmit beam indicated via the spatial relation configuration 410-a. The uplink signals 415 may include SRSs (e.g., SRSs not configured for beam management), PUCCH signals, CG or DG PUSCH signals, PRACH signals, or other uplink signals.

The UE 115 may transmit other uplink signals 415 after performing the random access procedure 420 using the transmit beam indicated via the spatial relation configuration 410-a or using a transmit beam indicated during the random access procedure 420 (e.g., a latest indicated transmit beam) until the UE 115 receives an explicit spatial relation configuration for a subsequent set of target uplink channels or reference signals. In the example of the transmit beam selection timeline 400, the UE 115 may transmit one or more other uplink signals using the indicated transmit beam after transmitting the uplink signal 415-a and before receiving the spatial relation configuration 410-b.

The UE 115 may receive an RRC configuration that may indicate a set of uplink channels or reference signals that may be transmitted after the random access procedure 420 using the most recent indicated transmit beam before the spatial relation configuration 410-b is received. Additionally or alternatively, the set of uplink channels and reference signals may be configured at the UE 115 (e.g., pre-defined uplink channels or reference signals). In one example, the set of uplink channels or reference signals may include PUSCH signals and PUCCCH signals, and may not include SRSs. That is, the UE 115 may not transmit SRSs using the most recent indicated transmit beam until the UE 115 receives the spatial relation configuration 410-b. In another example, the set of uplink channels and reference signals may include PUCCH signals, PUSCH signals, and SRS resources that are not configured for beam management (e.g., SRS resource not configured with usage=beamManagement). Use of the indicated transmit beam may not apply to SRSs that are configured for beam management because the UE 115 may perform transmit beam sweeping while transmitting SRSs configured for beam management.

The UE 115 may receive the spatial relation configuration 410-b indicating a spatial relation configuration for the uplink signal 415-b and one or more other subsequent uplink signals 415 to be transmitted by the UE 115. In some examples, the spatial relation configuration 410-b may point to a random access message 405 for transmit beam identification. Additionally or alternatively, the spatial relation configuration 410-b may point to other uplink signals, such as the uplink signal 415-a or other reference signals transmitted by the UE 115 (e.g., SRSs for beam management). The UE 115 may use the spatial relation configuration indicated via the spatial relation configuration 410-b for subsequent uplink transmissions after early initial access.

Accordingly, a spatial relation configuration 410 as described herein may point to a random access message 305 transmitted by a UE 115 for transmit beam identification. By using random access messages 305 for transmit beam identification, the UE 115 and a base station 105 may reduce latency and improve communication reliability for initial access during communication scenarios in which there may not be beam correspondence between an uplink and downlink.

Figure 5:
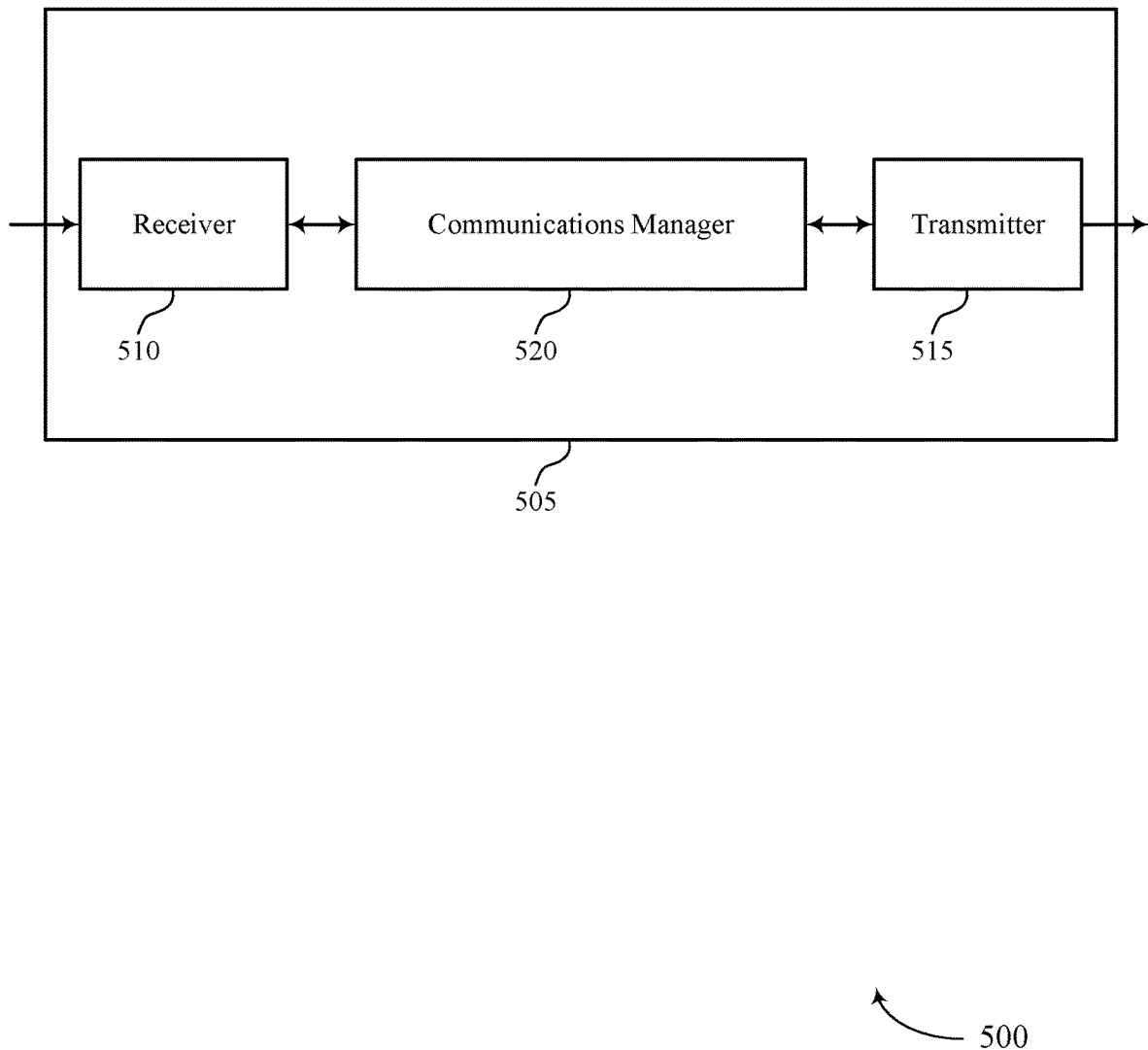
FIGS. 5 and 6 show block diagrams of devices that support spatial relation information based on random access messages in accordance with aspects of the present disclosure.

FIG. 5 shows a block diagram 500 of a device 505 that supports spatial relation information based on random access messages in accordance with aspects of the present disclosure. The device 505 may be an example of aspects of a UE 115 as described herein. The device 505 may include a receiver 510, a transmitter 515, and a communications manager 520. The device 505 may also include one or more processors, memory coupled with the one or more processors, and instructions stored in the memory that are executable by the one or more processors to enable the one or more processors to perform the spatial relation features discussed herein. Each of these components may be in communication with one another (e.g., via one or more buses).

The receiver 510 may provide a means for receiving information such as packets, user data, control information, or any combination thereof associated with various information channels (e.g., control channels, data channels, information channels related to spatial relation information based on random access messages). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to spatial relation information based on random access messages). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of spatial relation information based on random access messages as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for transmitting a random access message during a random access procedure between the UE and a base station. The communications manager 520 may be configured as or otherwise support a means for receiving a control signal that includes a spatial relation configuration for transmission, by the UE, of an uplink signal, the spatial relation configuration indicating that transmission of the uplink signal is via a transmit beam used in transmitting the random access message. The communications manager 520 may be configured as or otherwise support a means for transmitting the uplink signal using the transmit beam in accordance with the spatial relation configuration.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing and more efficient utilization of communication resources. The processor may receive and decode the spatial relation configuration received from a base station to identify a random access message and corresponding transmit beam. The processor may reduce processing by using the indicated transmit beam than if the processor selects a transmit beam without an indication from the base station. The spatial relation configuration may thereby reduce latency and processing. The processor of the device 505 may additionally or alternatively transmit subsequent uplink signals using the transmit beam indicated via the spatial relation configuration, which may provide for reduced processing and more efficient utilization of communication resources.

Figure 6:
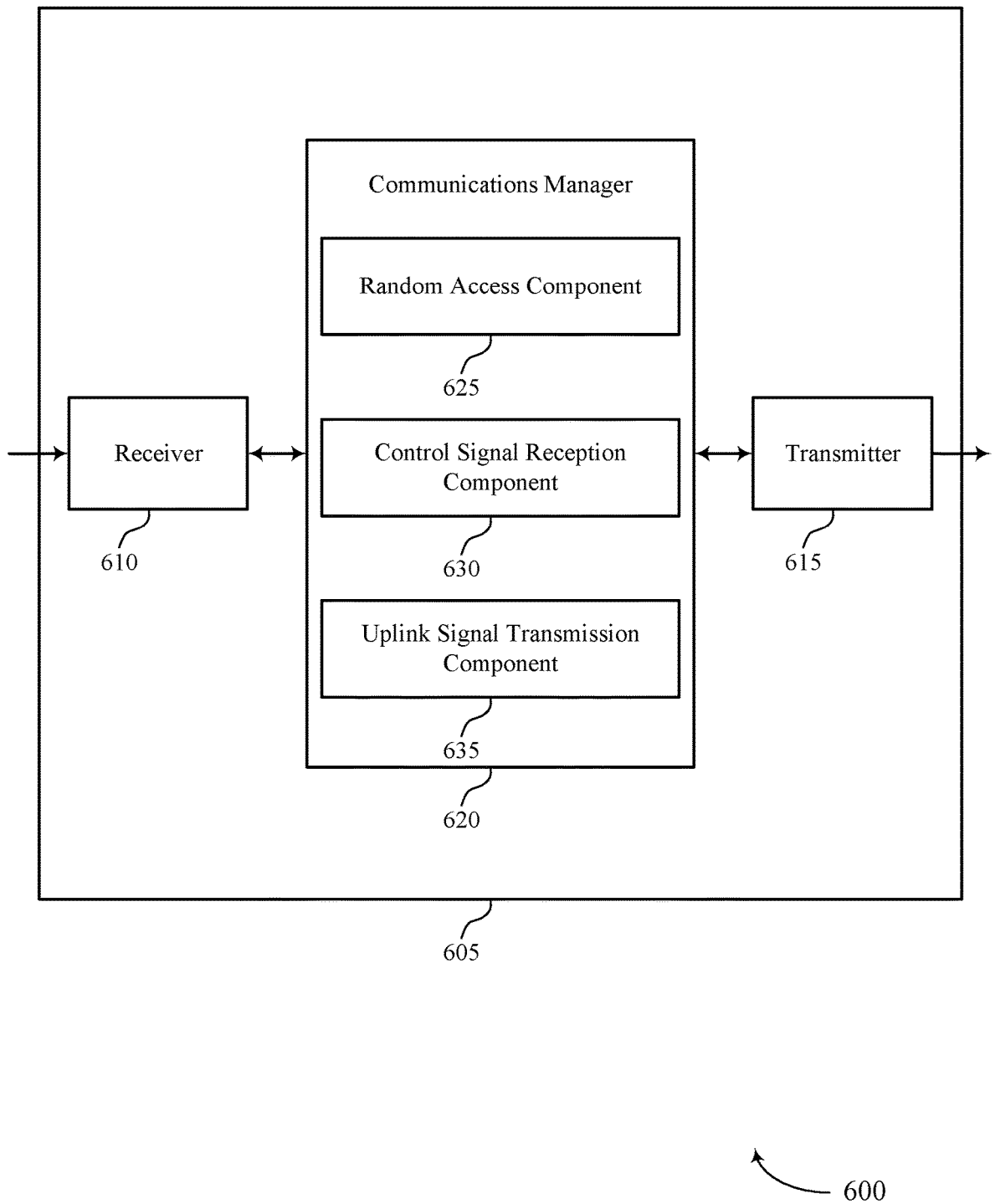

FIG. 6 shows a block diagram 600 of a device 605 that supports spatial relation information based on random access messages in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to spatial relation information based on random access messages). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to spatial relation information based on random access messages). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of spatial relation information based on random access messages as described herein. For example, the communications manager 620 may include a random access component 625, a control signal reception component 630, an uplink signal transmission component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The random access component 625 may be configured as or otherwise support a means for transmitting a random access message during a random access procedure between the UE and a base station. The control signal reception component 630 may be configured as or otherwise support a means for receiving a control signal that includes a spatial relation configuration for transmission, by the UE, of an uplink signal, the spatial relation configuration indicating that transmission of the uplink signal is via a transmit beam used in transmitting the random access message. The uplink signal transmission component 635 may be configured as or otherwise support a means for transmitting the uplink signal using the transmit beam in accordance with the spatial relation configuration.

In some cases, the random access component 625, the control signal reception component 630, and the uplink signal transmission component 635 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of random access component 625, the control signal reception component 630, and the uplink signal transmission component 635 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
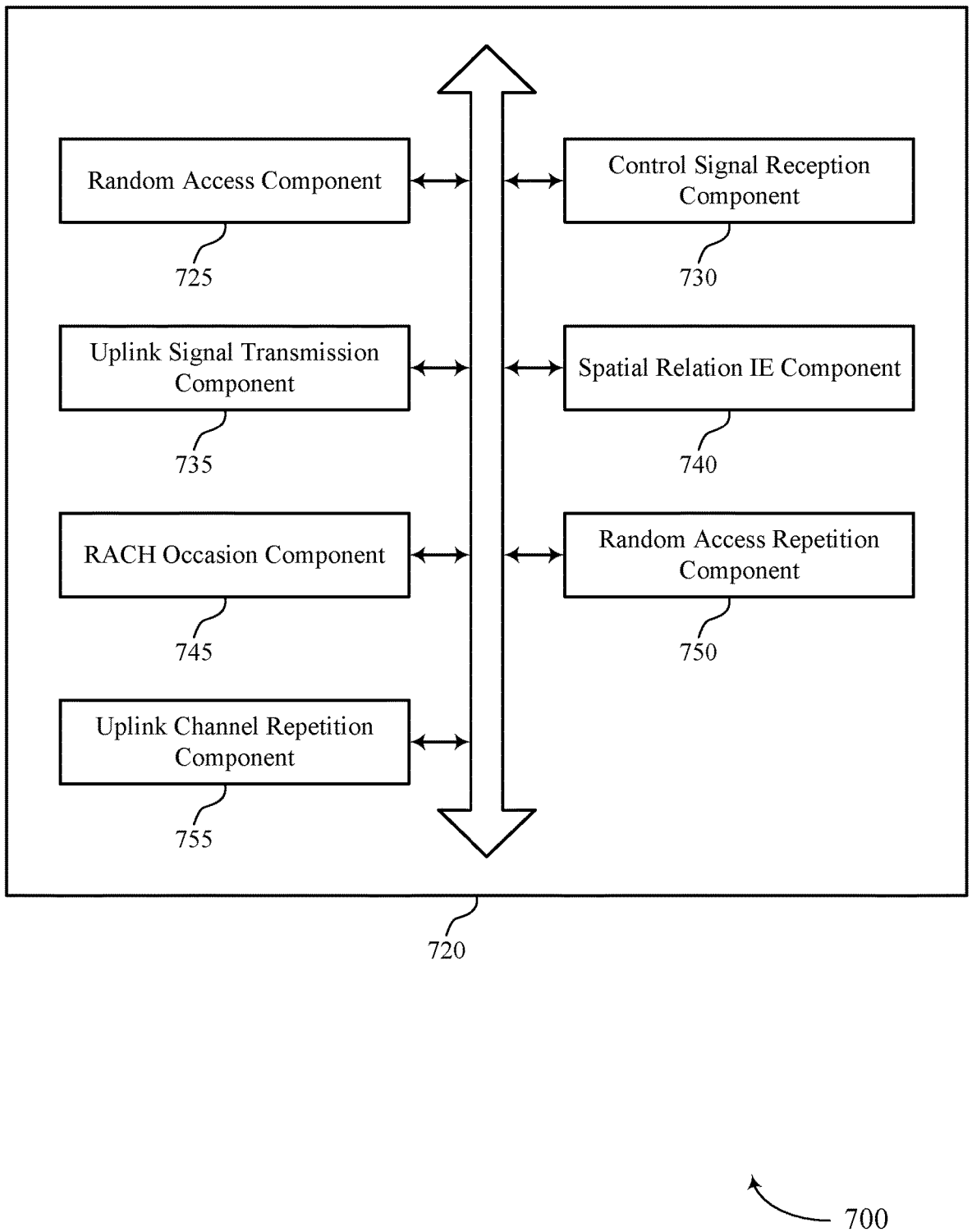
FIG. 7 shows a block diagram of a communications manager that supports spatial relation information based on random access messages in accordance with aspects of the present disclosure.

FIG. 7 shows a block diagram 700 of a communications manager 720 that supports spatial relation information based on random access messages in accordance with aspects of the present disclosure. The communications manager 720 may be an example of aspects of a communications manager 520, a communications manager 620, or both, as described herein. The communications manager 720, or various components thereof, may be an example of means for performing various aspects of spatial relation information based on random access messages as described herein. For example, the communications manager 720 may include a random access component 725, a control signal reception component 730, an uplink signal transmission component 735, a spatial relation IE component 740, a RACH occasion component 745, a random access repetition component 750, an uplink channel repetition component 755, or any combination thereof. Each of these components may communicate, directly or indirectly, with one another (e.g., via one or more buses).

The communications manager 720 may support wireless communication at a UE in accordance with examples as disclosed herein. The random access component 725 may be configured as or otherwise support a means for transmitting a random access message during a random access procedure between the UE and a base station. The control signal reception component 730 may be configured as or otherwise support a means for receiving a control signal that includes a spatial relation configuration for transmission, by the UE, of an uplink signal, the spatial relation configuration indicating that transmission of the uplink signal is via a transmit beam used in transmitting the random access message. The uplink signal transmission component 735 may be configured as or otherwise support a means for transmitting the uplink signal using the transmit beam in accordance with the spatial relation configuration.

In some examples, to support transmitting the random access message, the random access component 725 may be configured as or otherwise support a means for transmitting the random access message using the transmit beam, where the random access message indicated in the spatial relation configuration is one of a preamble message, an uplink shared channel message, or a reference signal used by the UE during the random access procedure.

In some examples, to support receiving the control signal, the spatial relation IE component 740 may be configured as or otherwise support a means for receiving the control signal as an RRC signal or a MAC-CE that configures the spatial relation configuration as a spatial relation IE.

In some examples, the spatial relation IE component 740 may be configured as or otherwise support a means for receiving a DCI signal that schedules the uplink signal and that indicates an identity of the random access message for the spatial relation IE included in the control signal.

In some examples, the RACH occasion component 745 may be configured as or otherwise support a means for transmitting the random access message, as a preamble random access message, during each of a set of multiple RACH occasions. In some examples, the RACH occasion component 745 may be configured as or otherwise support a means for identifying a specific one of the set of multiple RACH occasions on which transmission of the random access message was via the transmit beam.

In some examples, to support identifying the specific one of the set of multiple RACH occasions, the RACH occasion component 745 may be configured as or otherwise support a means for receiving an indication of the specific one of the set of multiple RACH occasions via the control signal including the spatial relation configuration or via a RA-RNTI corresponding to a second random access message received by the UE.

In some examples, the random access repetition component 750 may be configured as or otherwise support a means for transmitting the random access message, in the form of a preamble random access message, during a RACH occasion, where the random access message includes a set of random access repetition messages. In some examples, the random access repetition component 750 may be configured as or otherwise support a means for identifying a specific one of the set of random access repetition messages on which transmission of the random access message was via the transmit beam.

In some examples, to support identifying the specific one of the set of random access repetition messages, the random access repetition component 750 may be configured as or otherwise support a means for receiving an indication of a repetition number corresponding to the specific one of the set of random access repetition messages via the control signal including the spatial relation configuration or via a RA-RNTI corresponding to a second random access message received by the UE.

In some examples, the RACH occasion component 745 may be configured as or otherwise support a means for transmitting the random access message via a set of multiple segments of a RACH occasion. In some examples, the RACH occasion component 745 may be configured as or otherwise support a means for receiving the control signal including the spatial relation configuration, where the spatial relation configuration indicates a segment of the set of multiple segments.

In some examples, the uplink channel repetition component 755 may be configured as or otherwise support a means for transmitting the random access message via an uplink channel, where the random access message includes a set of uplink channel repetitions of the random access message. In some examples, the uplink channel repetition component 755 may be configured as or otherwise support a means for receiving the control signal including the spatial relation configuration, where the spatial relation configuration indicates an uplink channel repetition of the set of uplink channel repetitions.

In some examples, the uplink signal transmission component 735 may be configured as or otherwise support a means for transmitting a set of one or more other uplink signals after performing the random access procedure using the transmit beam in accordance with the spatial relation configuration, where the set of one or more other uplink signals includes PUSCH signals, or PUCCH signals, or SRSs not configured for beam management, or a combination thereof.

In some examples, the uplink signal transmission component 735 may be configured as or otherwise support a means for receiving an RRC configuration indicating the set of one or more other uplink signals.

In some examples, the control signal reception component 730 may be configured as or otherwise support a means for receiving a second control signal that includes a second spatial relation configuration for transmission, by the UE, of a second set of one or more other uplink signals, the second spatial relation configuration indicating that transmission of the second set of one or more other uplink signals is via a second transmit beam. In some examples, the uplink signal transmission component 735 may be configured as or otherwise support a means for transmitting the second set of one or more other uplink signals using the second transmit beam in accordance with the second spatial relation configuration.

In some examples, the spatial relation configuration indicates spatial relation information, a TCI state, or both corresponding to the transmit beam used in transmitting the random access message. In some examples, the uplink signal includes an SRS, a PUCCH signal, a CG PUSCH signal, a DG PUSCH signal, or a PRACH signal.

In some cases, the random access component 725, the control signal reception component 730, the uplink signal transmission component 735, the spatial relation IE component 740, the RACH occasion component 745, the random access repetition component 750, and the uplink channel repetition component 755 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the random access component 725, the control signal reception component 730, the uplink signal transmission component 735, the spatial relation IE component 740, the RACH occasion component 745, the random access repetition component 750, and the uplink channel repetition component 755 discussed herein.

Figure 8:
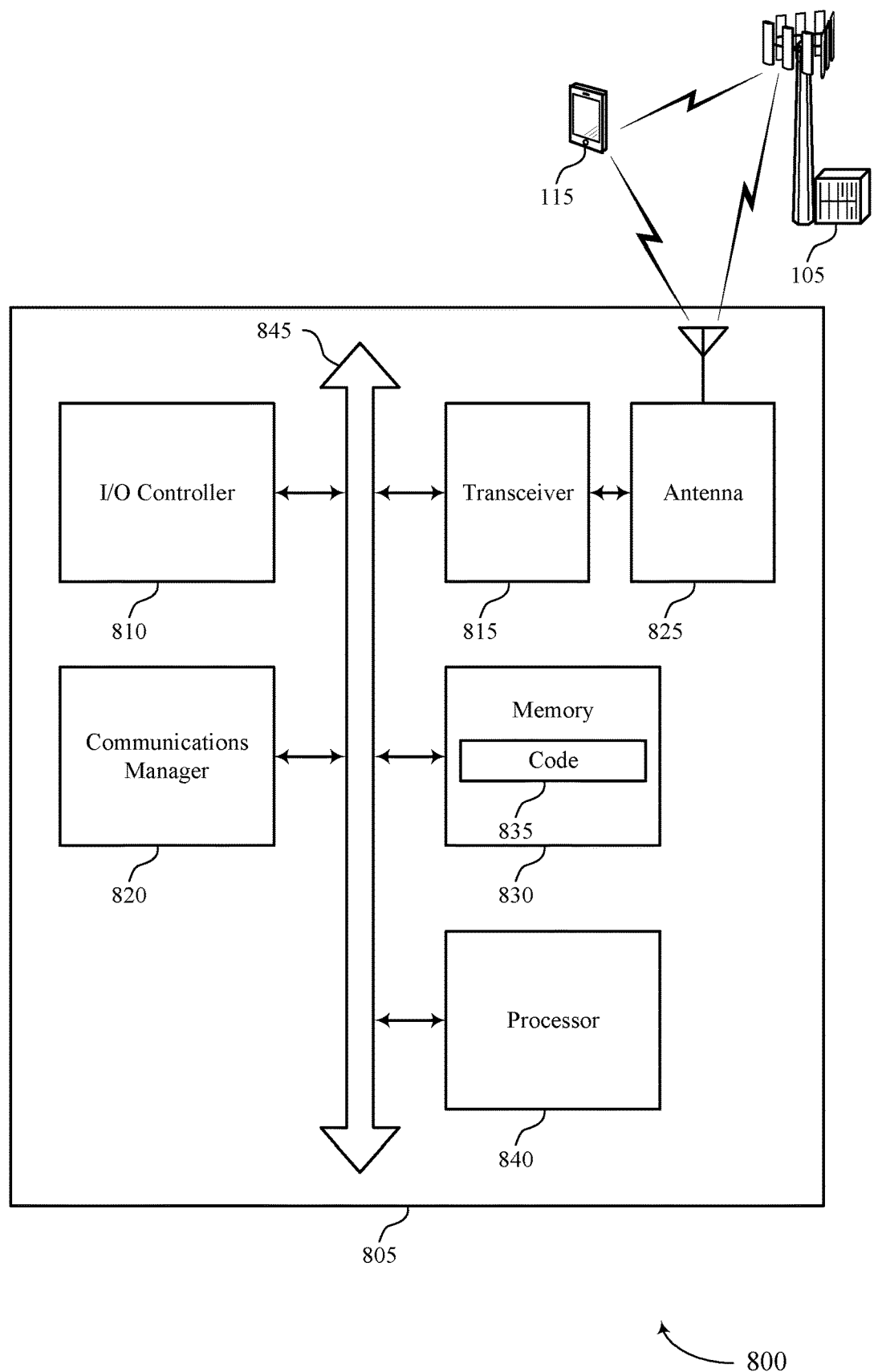
FIG. 8 shows a diagram of a system including a device that supports spatial relation information based on random access messages in accordance with aspects of the present disclosure.

FIG. 8 shows a diagram of a system 800 including a device 805 that supports spatial relation information based on random access messages in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting spatial relation information based on random access messages). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for transmitting a random access message during a random access procedure between the UE and a base station. The communications manager 820 may be configured as or otherwise support a means for receiving a control signal that includes a spatial relation configuration for transmission, by the UE, of an uplink signal, the spatial relation configuration indicating that transmission of the uplink signal is via a transmit beam used in transmitting the random access message. The communications manager 820 may be configured as or otherwise support a means for transmitting the uplink signal using the transmit beam in accordance with the spatial relation configuration.

By including or configuring the communications manager 820 in accordance with examples as described herein, the device 805 may support techniques for improved communication reliability, reduced latency, and improved coordination between devices. The device 805 may identify a transmit beam that is preferred by a base station quicker by performing uplink beam management during early initial access than if the device 805 waits to perform uplink beam management until after an RRC connection is established. The device 805 may thereby reduce latency and improve coordination between devices. By receiving the spatial relation configuration identifying a random access message, the device 805 may transmit subsequent uplink signals using a transmit beam that was selected by a base station, which may improve communication reliability and coordination between devices. Accordingly, the spatial relation configuration may provide for improved communications between a base station and the device 805 during initial access.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of spatial relation information based on random access messages as described herein, or the processor 840 and the memory 830 may be otherwise configured to perform or support such operations.

Figure 9:
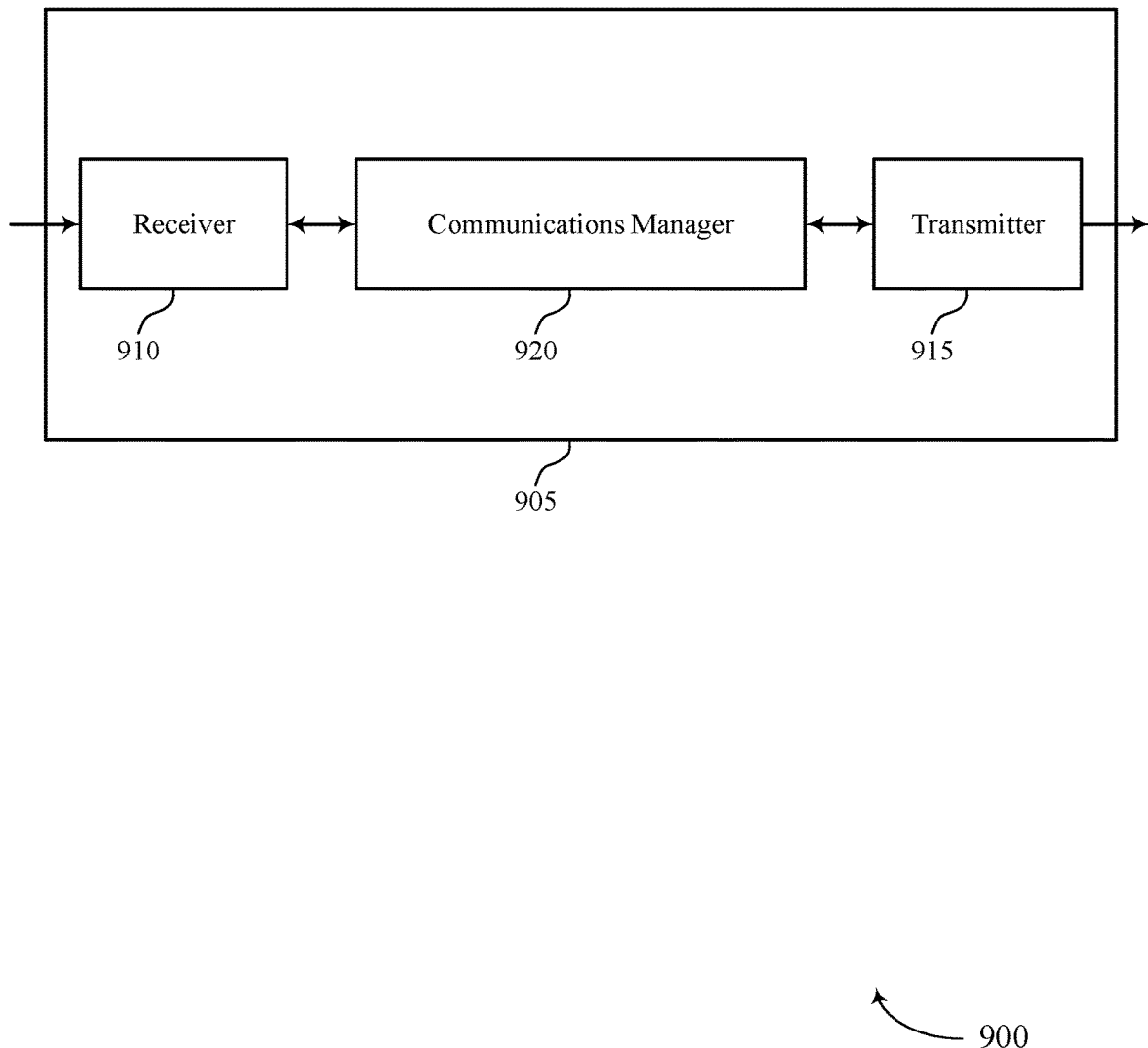
FIGS. 9 and 10 show block diagrams of devices that support spatial relation information based on random access messages in accordance with aspects of the present disclosure.

FIG. 9 shows a block diagram 900 of a device 905 that supports spatial relation information based on random access messages in accordance with aspects of the present disclosure. The device 905 may be an example of aspects of a base station 105 as described herein. The device 905 may include a receiver 910, a transmitter 915, and a communications manager 920. The device 905 may also include one or more processors, memory coupled with the one or more processors, and instructions stored in the memory that are executable by the one or more processors to enable the one or more processors to perform the spatial relation features discussed herein. Each of these components may be in communication with one another (e.g., via one or more buses).

The receiver 910 may provide a means for receiving information such as packets, user data, control information, or any combination thereof associated with various information channels (e.g., control channels, data channels, information channels related to spatial relation information based on random access messages). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to spatial relation information based on random access messages). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of spatial relation information based on random access messages as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for receiving, from a UE, a random access message during a random access procedure between the UE and the base station. The communications manager 920 may be configured as or otherwise support a means for transmitting, to the UE, a control signal that includes a spatial relation configuration for transmission, by the UE, of an uplink signal, the spatial relation configuration indicating that transmission of the uplink signal is via a transmit beam used in transmitting the random access message. The communications manager 920 may be configured as or otherwise support a means for receiving, from the UE, the uplink signal using the transmit beam in accordance with the spatial relation configuration.

Figure 10:
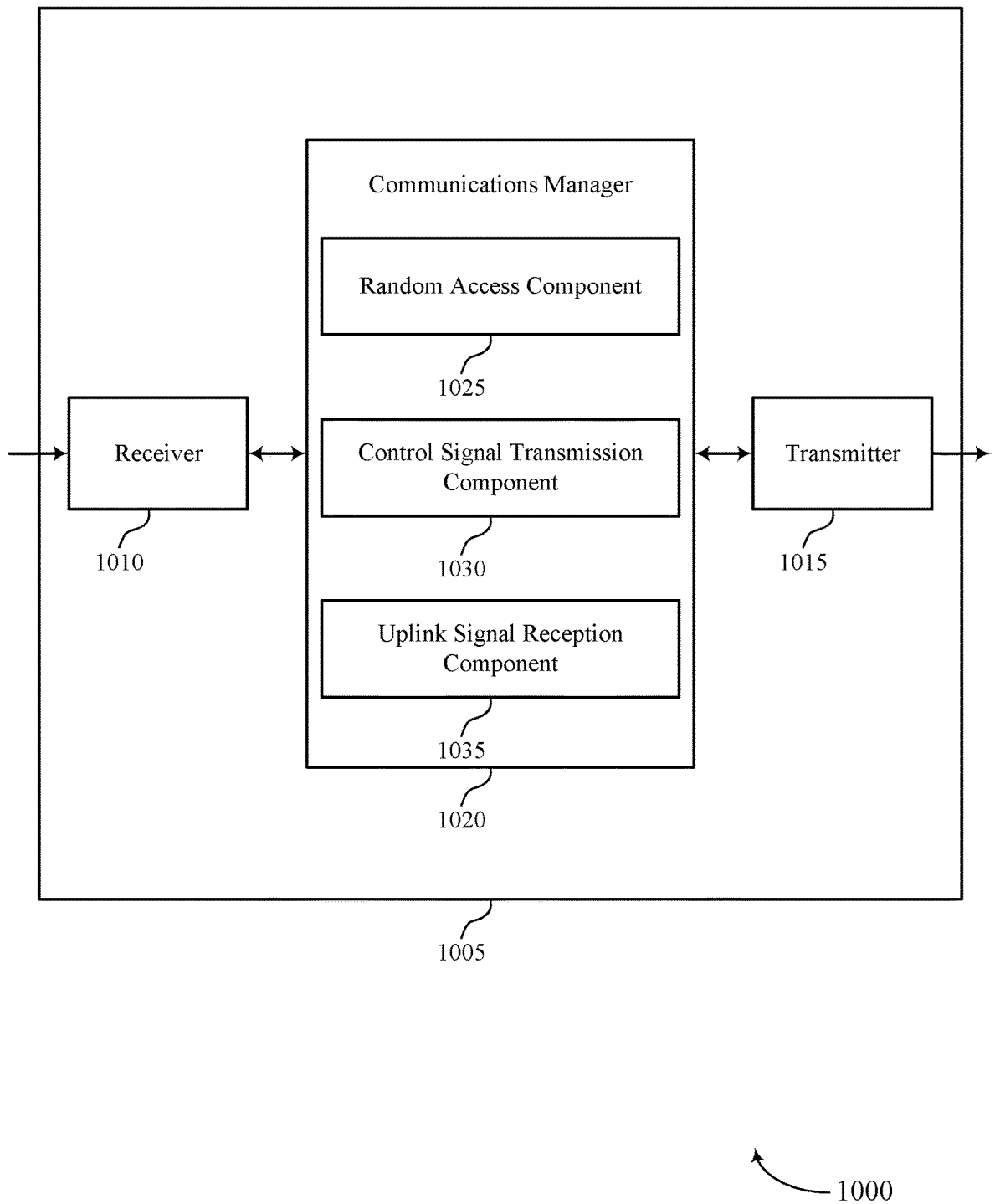

FIG. 10 shows a block diagram 1000 of a device 1005 that supports spatial relation information based on random access messages in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to spatial relation information based on random access messages). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to spatial relation information based on random access messages). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of spatial relation information based on random access messages as described herein. For example, the communications manager 1020 may include a random access component 1025, a control signal transmission component 1030, an uplink signal reception component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The random access component 1025 may be configured as or otherwise support a means for receiving, from a UE, a random access message during a random access procedure between the UE and the base station. The control signal transmission component 1030 may be configured as or otherwise support a means for transmitting, to the UE, a control signal that includes a spatial relation configuration for transmission, by the UE, of an uplink signal, the spatial relation configuration indicating that transmission of the uplink signal is via a transmit beam used in transmitting the random access message. The uplink signal reception component 1035 may be configured as or otherwise support a means for receiving, from the UE, the uplink signal using the transmit beam in accordance with the spatial relation configuration.

In some cases, the random access component 1025, the control signal transmission component 1030, and the uplink signal reception component 1035 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the random access component 1025, the control signal transmission component 1030, and the uplink signal reception component 1035 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 11:
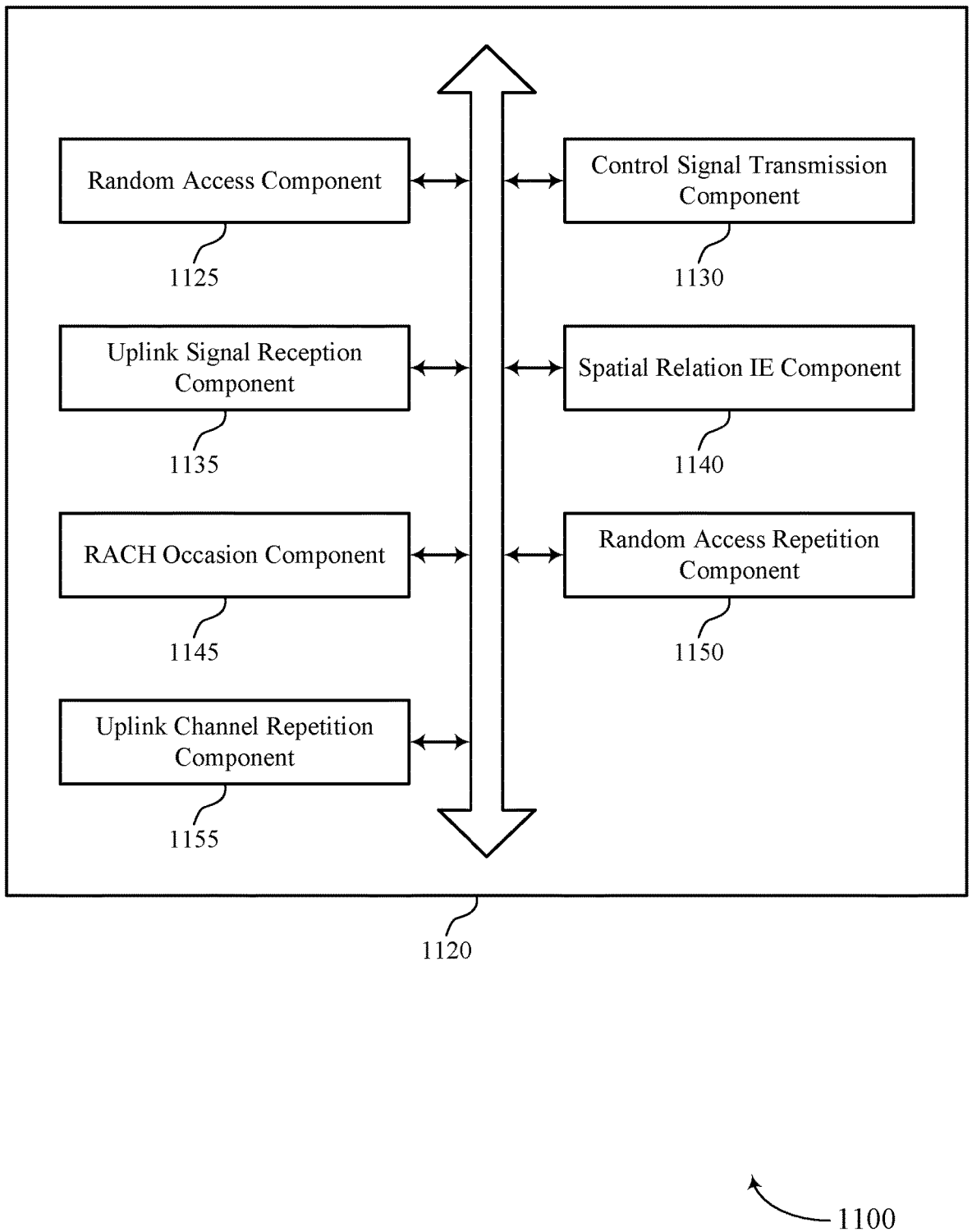
FIG. 11 shows a block diagram of a communications manager that supports spatial relation information based on random access messages in accordance with aspects of the present disclosure.

FIG. 11 shows a block diagram 1100 of a communications manager 1120 that supports spatial relation information based on random access messages in accordance with aspects of the present disclosure. The communications manager 1120 may be an example of aspects of a communications manager 920, a communications manager 1020, or both, as described herein. The communications manager 1120, or various components thereof, may be an example of means for performing various aspects of spatial relation information based on random access messages as described herein. For example, the communications manager 1120 may include a random access component 1125, a control signal transmission component 1130, an uplink signal reception component 1135, a spatial relation IE component 1140, a RACH occasion component 1145, a random access repetition component 1150, an uplink channel repetition component 1155, or any combination thereof. Each of these components may communicate, directly or indirectly, with one another (e.g., via one or more buses).

The communications manager 1120 may support wireless communication at a base station in accordance with examples as disclosed herein. The random access component 1125 may be configured as or otherwise support a means for receiving, from a UE, a random access message during a random access procedure between the UE and the base station. The control signal transmission component 1130 may be configured as or otherwise support a means for transmitting, to the UE, a control signal that includes a spatial relation configuration for transmission, by the UE, of an uplink signal, the spatial relation configuration indicating that transmission of the uplink signal is via a transmit beam used in transmitting the random access message. The uplink signal reception component 1135 may be configured as or otherwise support a means for receiving, from the UE, the uplink signal using the transmit beam in accordance with the spatial relation configuration.

In some examples, to support receiving the random access message, the random access component 1125 may be configured as or otherwise support a means for receiving the random access message using the transmit beam, where the random access message indicated in the spatial relation configuration is one of a preamble message, an uplink shared channel message, or a reference signal used by the UE during the random access procedure.

In some examples, to support transmitting the control signal, the spatial relation IE component 1140 may be configured as or otherwise support a means for transmitting the control signal as an RRC signal or a MAC-CE that configures the spatial relation configuration as a spatial relation IE.

In some examples, the spatial relation IE component 1140 may be configured as or otherwise support a means for transmitting a DCI signal that schedules the uplink signal and that indicates an identity of the random access message for the spatial relation IE included in the control signal.

In some examples, the RACH occasion component 1145 may be configured as or otherwise support a means for receiving the random access message, as a preamble random access message, during each of a set of multiple RACH occasions. In some examples, the RACH occasion component 1145 may be configured as or otherwise support a means for transmitting, to the UE, an indication of a specific one of the set of multiple RACH occasions on which reception of the random access message was via the transmit beam, where the indication of the specific one of the set of multiple RACH occasions is transmitted via the control signal including the spatial relation configuration or via a RA-RNTI corresponding to a second random access message transmitted by the base station.

In some examples, the random access repetition component 1150 may be configured as or otherwise support a means for receiving the random access message, in the form of a preamble random access message, during a RACH occasion, where the random access message includes a set of random access repetition messages. In some examples, the random access repetition component 1150 may be configured as or otherwise support a means for transmitting, to the UE, an indication of a repetition number corresponding to a specific one of the set of random access repetition messages on which reception of the random access message was via the transmit beam, where the indication of the repetition number is transmitted via the control signal including the spatial relation configuration or via a RA-RNTI corresponding to a second random access message transmitted by the base station.

In some examples, the RACH occasion component 1145 may be configured as or otherwise support a means for receiving the random access message via a set of multiple segments of a RACH occasion. In some examples, the RACH occasion component 1145 may be configured as or otherwise support a means for transmitting the control signal including the spatial relation configuration, where the spatial relation configuration indicates a segment of the set of multiple segments.

In some examples, the uplink channel repetition component 1155 may be configured as or otherwise support a means for receiving the random access message via an uplink channel, where the random access message includes a set of uplink channel repetitions of the random access message. In some examples, the uplink channel repetition component 1155 may be configured as or otherwise support a means for transmitting the control signal including the spatial relation configuration, where the spatial relation configuration indicates an uplink channel repetition of the set of uplink channel repetitions.

In some examples, the uplink signal reception component 1135 may be configured as or otherwise support a means for receiving, from the UE, a set of one or more other uplink signals using the transmit beam in accordance with the spatial relation configuration, where the set of one or more other uplink signals include PUSCH signals, or PUCCH signals, or SRSs not configured for beam management, or a combination thereof.

In some examples, the control signal transmission component 1130 may be configured as or otherwise support a means for transmitting, to the UE, a RRC configuration indicating the set of one or more other uplink signals.

In some examples, the control signal transmission component 1130 may be configured as or otherwise support a means for transmitting, to the UE, a second control signal that includes a second spatial relation configuration for transmission, by the UE, of a second set of one or more other uplink signals, the second spatial relation configuration indicating that transmission of the second set of one or more other uplink signals is via a second transmit beam. In some examples, the uplink signal reception component 1135 may be configured as or otherwise support a means for receiving, from the UE, the second set of one or more other uplink signals using the second transmit beam in accordance with the second spatial relation configuration.

In some examples, the spatial relation configuration indicates spatial relation information, a TCI state, or both corresponding to the transmit beam used in transmitting the random access message. In some examples, the uplink signal includes an SRS, a PUCCH signal, a CG PUSCH signal, a DG PUSCH signal, or a PRACH signal.

In some cases, the random access component 1125, the control signal transmission component 1130, the uplink signal reception component 1135, the spatial relation IE component 1140, the RACH occasion component 1145, the random access repetition component 1150, and the uplink channel repetition component 1155 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the random access component 1125, the control signal transmission component 1130, the uplink signal reception component 1135, the spatial relation IE component 1140, the RACH occasion component 1145, the random access repetition component 1150, and the uplink channel repetition component 1155 discussed herein.

Figure 12:
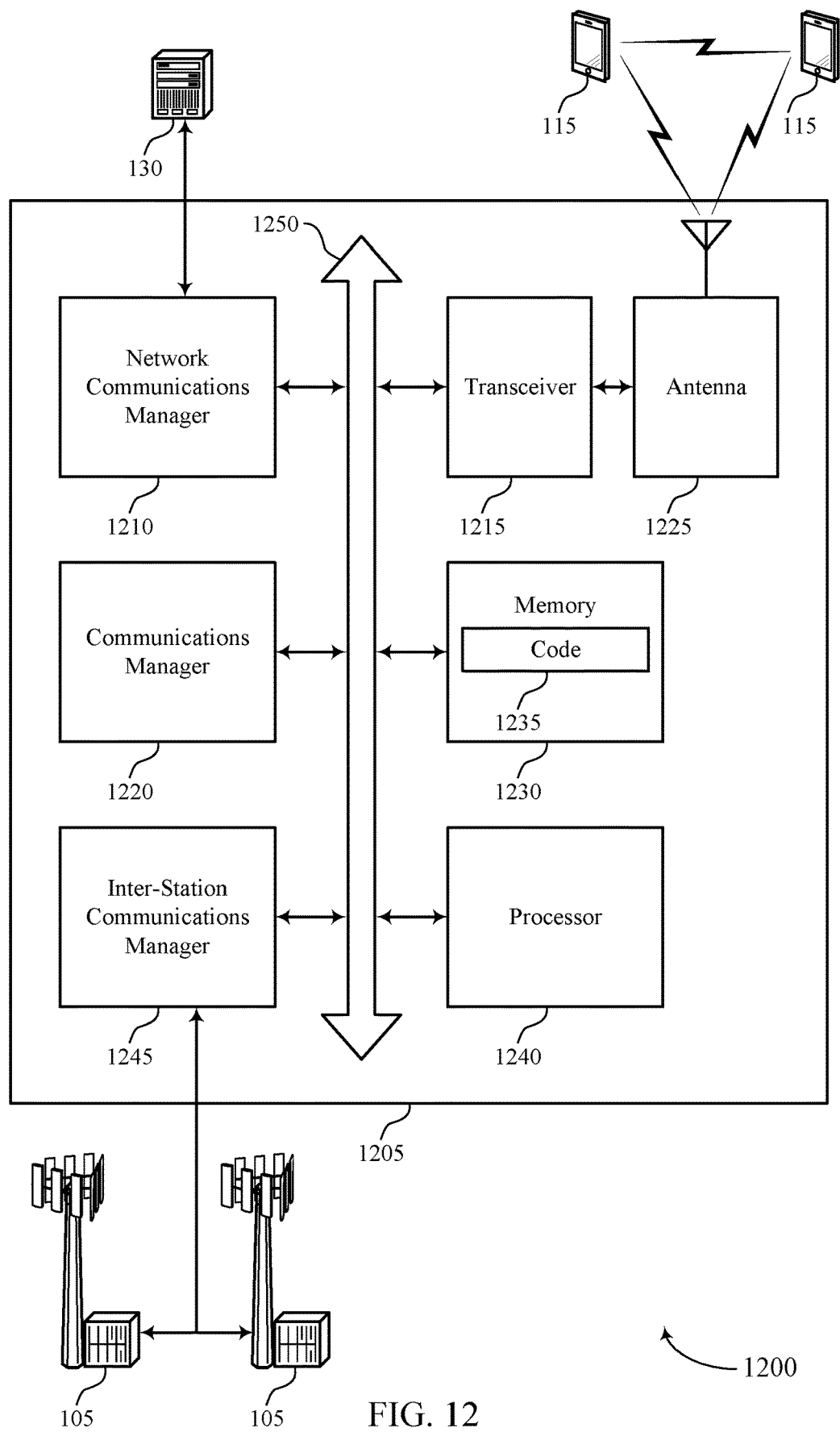
FIG. 12 shows a diagram of a system including a device that supports spatial relation information based on random access messages in accordance with aspects of the present disclosure.

FIG. 12 shows a diagram of a system 1200 including a device 1205 that supports spatial relation information based on random access messages in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting spatial relation information based on random access messages). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for receiving, from a UE, a random access message during a random access procedure between the UE and the base station. The communications manager 1220 may be configured as or otherwise support a means for transmitting, to the UE, a control signal that includes a spatial relation configuration for transmission, by the UE, of an uplink signal, the spatial relation configuration indicating that transmission of the uplink signal is via a transmit beam used in transmitting the random access message. The communications manager 1220 may be configured as or otherwise support a means for receiving, from the UE, the uplink signal using the transmit beam in accordance with the spatial relation configuration.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of spatial relation information based on random access messages as described herein, or the processor 1240 and the memory 1230 may be otherwise configured to perform or support such operations.

Figure 13:
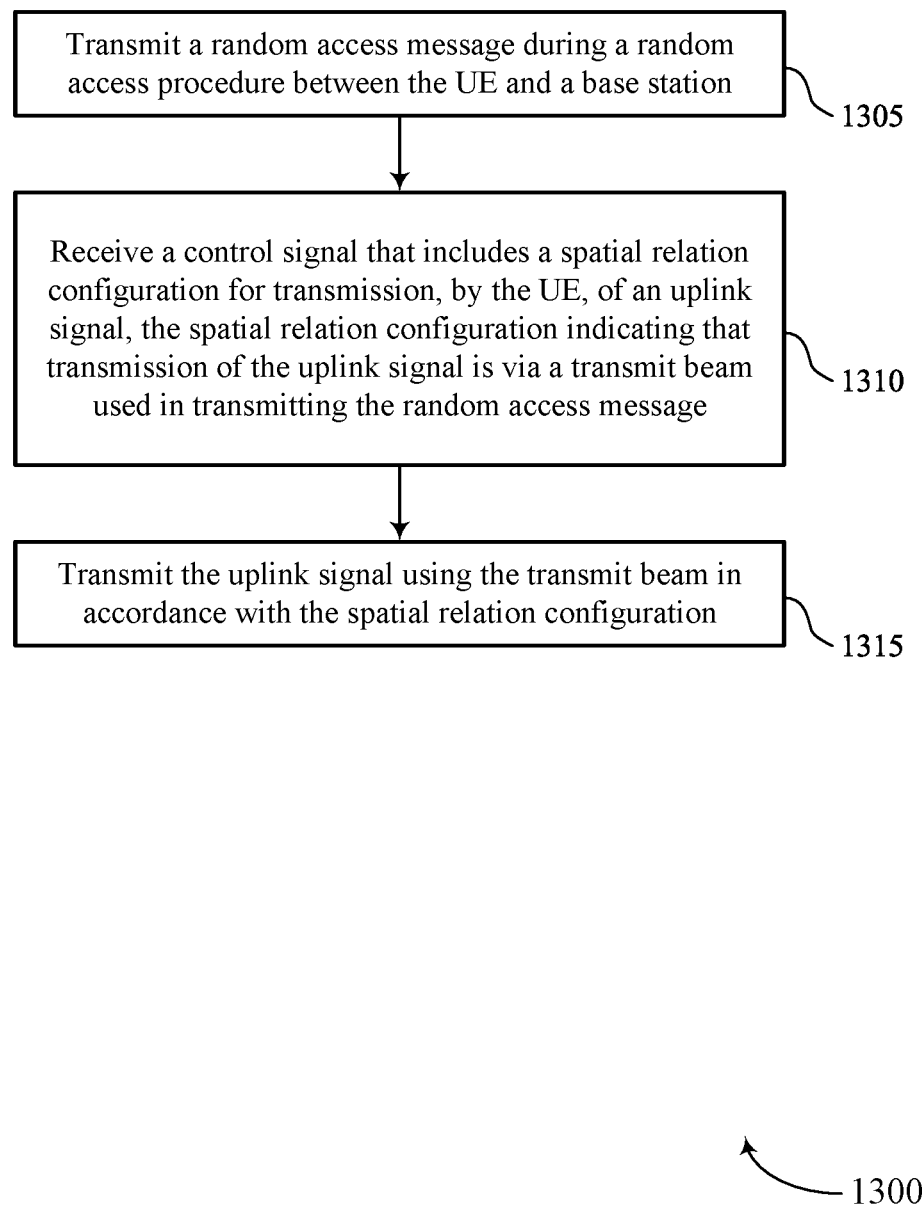
FIGS. 13 through 16 show flowcharts illustrating methods that support spatial relation information based on random access messages in accordance with aspects of the present disclosure.

FIG. 13 shows a flowchart illustrating a method 1300 that supports spatial relation information based on random access messages in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting a random access message during a random access procedure between the UE and a base station. The operations of 1305 may be performed in accordance with examples as disclosed herein. In some examples, aspects of the operations of 1305 may be performed by a random access component 725 as described with reference to FIG. 7.

At 1310, the method may include receiving a control signal that includes a spatial relation configuration for transmission, by the UE, of an uplink signal, the spatial relation configuration indicating that transmission of the uplink signal is via a transmit beam used in transmitting the random access message. The operations of 1310 may be performed in accordance with examples as disclosed herein. In some examples, aspects of the operations of 1310 may be performed by a control signal reception component 730 as described with reference to FIG. 7.

At 1315, the method may include transmitting the uplink signal using the transmit beam in accordance with the spatial relation configuration. The operations of 1315 may be performed in accordance with examples as disclosed herein. In some examples, aspects of the operations of 1315 may be performed by an uplink signal transmission component 735 as described with reference to FIG. 7.

Figure 14:
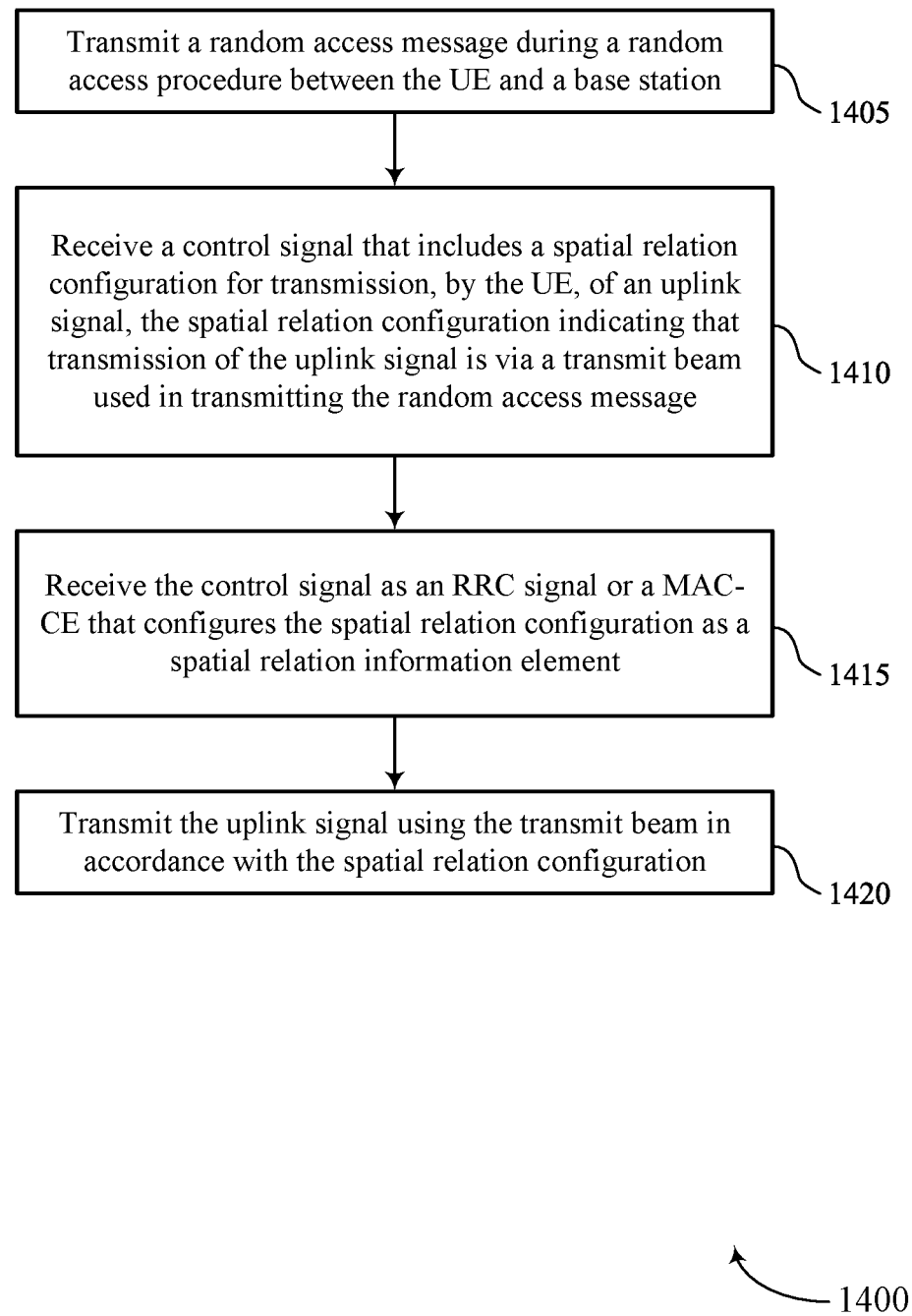

FIG. 14 shows a flowchart illustrating a method 1400 that supports spatial relation information based on random access messages in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting a random access message during a random access procedure between the UE and a base station. The operations of 1405 may be performed in accordance with examples as disclosed herein. In some examples, aspects of the operations of 1405 may be performed by a random access component 725 as described with reference to FIG. 7.

At 1410, the method may include receiving a control signal that includes a spatial relation configuration for transmission, by the UE, of an uplink signal, the spatial relation configuration indicating that transmission of the uplink signal is via a transmit beam used in transmitting the random access message. The operations of 1410 may be performed in accordance with examples as disclosed herein. In some examples, aspects of the operations of 1410 may be performed by a control signal reception component 730 as described with reference to FIG. 7.

At 1415, the method may include receiving the control signal as an RRC signal or a MAC-CE that configures the spatial relation configuration as a spatial relation IE. The operations of 1415 may be performed in accordance with examples as disclosed herein. In some examples, aspects of the operations of 1415 may be performed by a spatial relation IE component 740 as described with reference to FIG. 7.

At 1420, the method may include transmitting the uplink signal using the transmit beam in accordance with the spatial relation configuration. The operations of 1420 may be performed in accordance with examples as disclosed herein. In some examples, aspects of the operations of 1420 may be performed by an uplink signal transmission component 735 as described with reference to FIG. 7.

Figure 15:
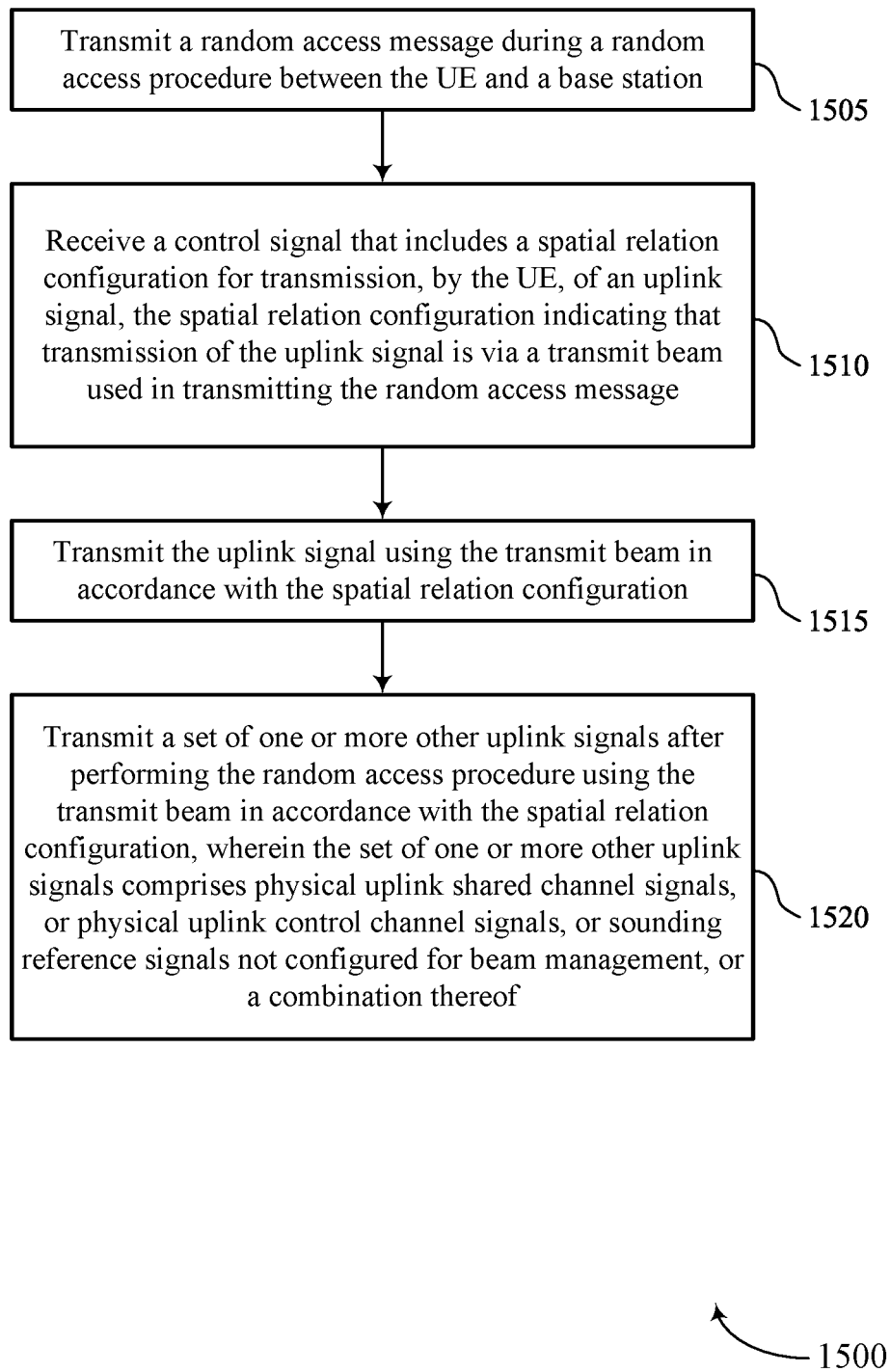

FIG. 15 shows a flowchart illustrating a method 1500 that supports spatial relation information based on random access messages in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include transmitting a random access message during a random access procedure between the UE and a base station. The operations of 1505 may be performed in accordance with examples as disclosed herein. In some examples, aspects of the operations of 1505 may be performed by a random access component 725 as described with reference to FIG. 7.

At 1510, the method may include receiving a control signal that includes a spatial relation configuration for transmission, by the UE, of an uplink signal, the spatial relation configuration indicating that transmission of the uplink signal is via a transmit beam used in transmitting the random access message. The operations of 1510 may be performed in accordance with examples as disclosed herein. In some examples, aspects of the operations of 1510 may be performed by a control signal reception component 730 as described with reference to FIG. 7.

At 1515, the method may include transmitting the uplink signal using the transmit beam in accordance with the spatial relation configuration. The operations of 1515 may be performed in accordance with examples as disclosed herein. In some examples, aspects of the operations of 1515 may be performed by an uplink signal transmission component 735 as described with reference to FIG. 7.

At 1520, the method may include transmitting a set of one or more other uplink signals after performing the random access procedure using the transmit beam in accordance with the spatial relation configuration, where the set of one or more other uplink signals includes physical uplink shared channel signals, or physical uplink control channel signals, or sounding reference signals not configured for beam management, or a combination thereof. The operations of 1520 may be performed in accordance with examples as disclosed herein. In some examples, aspects of the operations of 1520 may be performed by an uplink signal transmission component 735 as described with reference to FIG. 7.

Figure 16:
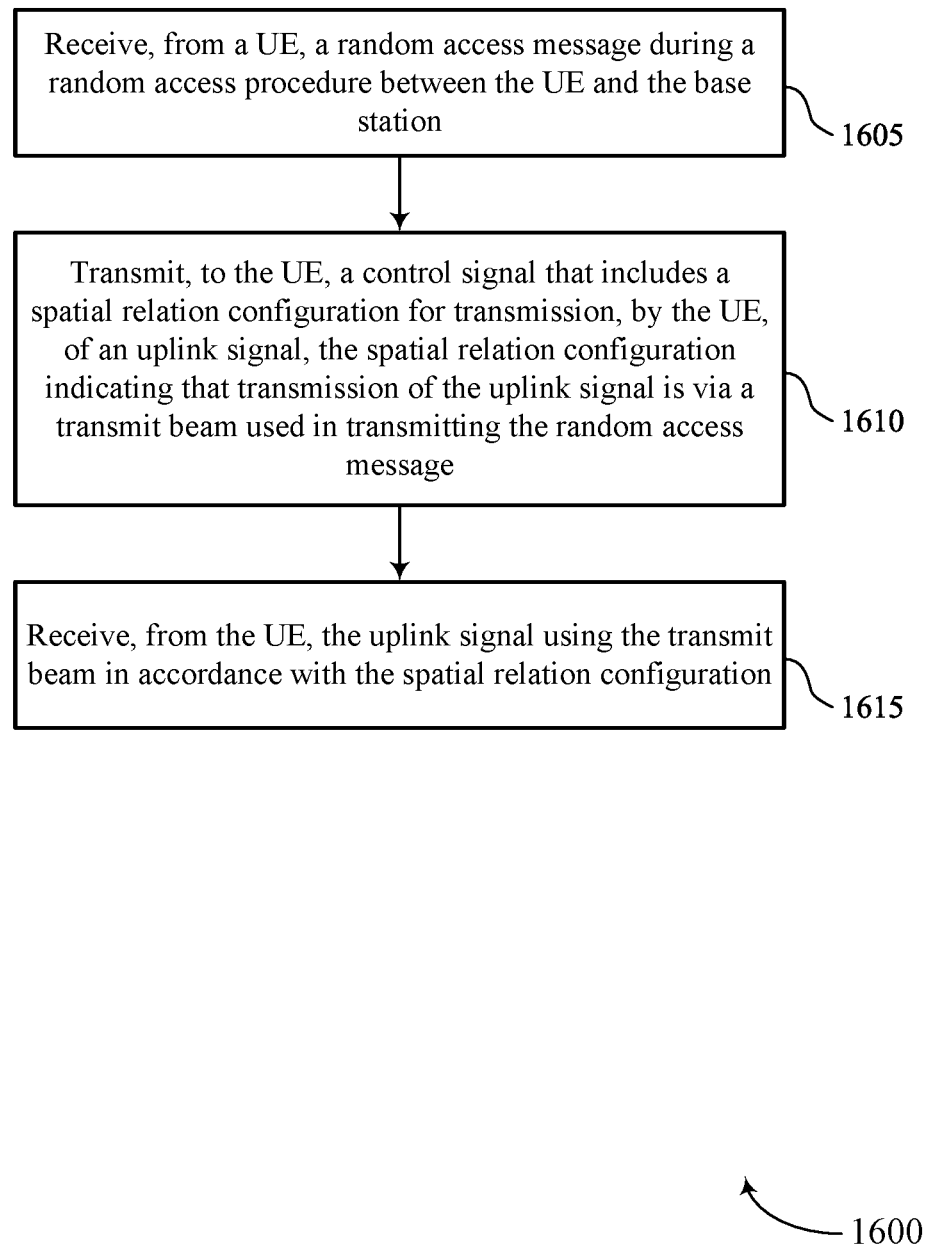

FIG. 16 shows a flowchart illustrating a method 1600 that supports spatial relation information based on random access messages in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include receiving, from a UE, a random access message during a random access procedure between the UE and the base station. The operations of 1605 may be performed in accordance with examples as disclosed herein. In some examples, aspects of the operations of 1605 may be performed by a random access component 1125 as described with reference to FIG. 11.

At 1610, the method may include transmitting, to the UE, a control signal that includes a spatial relation configuration for transmission, by the UE, of an uplink signal, the spatial relation configuration indicating that transmission of the uplink signal is via a transmit beam used in transmitting the random access message. The operations of 1610 may be performed in accordance with examples as disclosed herein. In some examples, aspects of the operations of 1610 may be performed by a control signal transmission component 1130 as described with reference to FIG. 11.

At 1615, the method may include receiving, from the UE, the uplink signal using the transmit beam in accordance with the spatial relation configuration. The operations of 1615 may be performed in accordance with examples as disclosed herein. In some examples, aspects of the operations of 1615 may be performed by an uplink signal reception component 1135 as described with reference to FIG. 11.

The following provides an overview of aspects of the present disclosure:

Aspect 1: A method for wireless communication at a UE, comprising: transmitting a random access message during a random access procedure between the UE and a base station; receiving a control signal that includes a spatial relation configuration for transmission, by the UE, of an uplink signal, the spatial relation configuration indicating that transmission of the uplink signal is via a transmit beam used in transmitting the random access message; and transmitting the uplink signal using the transmit beam in accordance with the spatial relation configuration.

Aspect 2: The method of aspect 1, wherein transmitting the random access message further comprises: transmitting the random access message using the transmit beam, wherein the random access message indicated in the spatial relation configuration is one of a preamble message, an uplink shared channel message, or a reference signal used by the UE during the random access procedure.

Aspect 3: The method of any of aspects 1 through 2, wherein receiving the control signal further comprises: receiving the control signal as an RRC signal or a medium access control (MAC) control element (CE) that configures the spatial relation configuration as a spatial relation information element.

Aspect 4: The method of aspect 3, further comprising: receiving a downlink control information signal that schedules the uplink signal and that indicates an identity of the random access message for the spatial relation information element included in the control signal.

Aspect 5: The method of any of aspects 1 through 4, further comprising: transmitting the random access message, as a preamble random access message, during each of a plurality of random access channel occasions; and identifying a specific one of the plurality of random access channel occasions on which transmission of the random access message was via the transmit beam.

Aspect 6: The method of aspect 5, wherein identifying the specific one of the plurality of random access channel occasions comprises: receiving an indication of the specific one of the plurality of random access channel occasions via the control signal comprising the spatial relation configuration or via a random access radio network temporary identifier corresponding to a second random access message received by the UE.

Aspect 7: The method of any of aspects 1 through 4, further comprising: transmitting the random access message, in the form of a preamble random access message, during a random access channel occasion, wherein the random access message comprises a set of random access repetition messages; and identifying a specific one of the set of random access repetition messages on which transmission of the random access message was via the transmit beam.

Aspect 8: The method of aspect 7, wherein identifying the specific one of the set of random access repetition messages comprises: receiving an indication of a repetition number corresponding to the specific one of the set of random access repetition messages via the control signal comprising the spatial relation configuration or via a random access radio network temporary identifier corresponding to a second random access message received by the UE.

Aspect 9: The method of any of aspects 1 through 4, further comprising: transmitting the random access message via a plurality of segments of a random access channel occasion; and receiving the control signal comprising the spatial relation configuration, wherein the spatial relation configuration indicates a segment of the plurality of segments.

Aspect 10: The method of any of aspects 1 through 4, further comprising: transmitting the random access message via an uplink channel, wherein the random access message comprises a set of uplink channel repetitions of the random access message; and receiving the control signal comprising the spatial relation configuration, wherein the spatial relation configuration indicates an uplink channel repetition of the set of uplink channel repetitions.

Aspect 11: The method of any of aspects 1 through 10, further comprising: transmitting a set of one or more other uplink signals after performing the random access procedure using the transmit beam in accordance with the spatial relation configuration, wherein the set of one or more other uplink signals comprises physical uplink shared channel signals, or physical uplink control channel signals, or sounding reference signals not configured for beam management, or a combination thereof.

Aspect 12: The method of aspect 11, further comprising: receiving a radio resource control configuration indicating the set of one or more other uplink signals.

Aspect 13: The method of any of aspects 11 through 12, further comprising: receiving a second control signal that includes a second spatial relation configuration for transmission, by the UE, of a second set of one or more other uplink signals, the second spatial relation configuration indicating that transmission of the second set of one or more other uplink signals is via a second transmit beam; and transmitting the second set of one or more other uplink signals using the second transmit beam in accordance with the second spatial relation configuration.

Aspect 14: The method of any of aspects 1 through 13, wherein the spatial relation configuration indicates spatial relation information, a transmission configuration indicator state, or both corresponding to the transmit beam used in transmitting the random access message.

Aspect 15: The method of any of aspects 1 through 14, wherein the uplink signal comprises a sounding reference signal, a physical uplink control channel signal, a configured grant physical uplink shared channel signal, a dynamic grant physical uplink shared channel signal, or a physical random access channel signal.

Aspect 16: A method for wireless communication at a base station, comprising: receiving, from a UE, a random access message during a random access procedure between the UE and the base station; transmitting, to the UE, a control signal that includes a spatial relation configuration for transmission, by the UE, of an uplink signal, the spatial relation configuration indicating that transmission of the uplink signal is via a transmit beam used in transmitting the random access message; and receiving, from the UE, the uplink signal using the transmit beam in accordance with the spatial relation configuration.

Aspect 17: The method of aspect 16, wherein receiving the random access message further comprises: receiving the random access message using the transmit beam, wherein the random access message indicated in the spatial relation configuration is one of a preamble message, an uplink shared channel message, or a reference signal used by the UE during the random access procedure.

Aspect 18: The method of any of aspects 16 through 17, wherein transmitting the control signal further comprises: transmitting the control signal as an RRC signal or a medium access control (MAC) control element (CE) that configures the spatial relation configuration as a spatial relation information element Aspect 19: The method of aspect 18, further comprising: transmitting a downlink control information signal that schedules the uplink signal and that indicates an identity of the random access message for the spatial relation information element included in the control signal.

Aspect 20: The method of any of aspects 16 through 19, further comprising: receiving the random access message, as a preamble random access message, during each of a plurality of random access channel occasions; and transmitting, to the UE, an indication of a specific one of the plurality of random access channel occasions on which reception of the random access message was via the transmit beam, wherein the indication of the specific one of the plurality of random access channel occasions is transmitted via the control signal comprising the spatial relation configuration or via a random access radio network temporary identifier corresponding to a second random access message transmitted by the base station.

Aspect 21: The method of any of aspects 16 through 19, further comprising: receiving the random access message, in the form of a preamble random access message, during a random access channel occasion, wherein the random access message comprises a set of random access repetition messages; and transmitting, to the UE, an indication of a repetition number corresponding to a specific one of the set of random access repetition messages on which reception of the random access message was via the transmit beam, wherein the indication of the repetition number is transmitted via the control signal comprising the spatial relation configuration or via a random access radio network temporary identifier corresponding to a second random access message transmitted by the base station.

Aspect 22: The method of any of aspects 16 through 19, further comprising: receiving the random access message via a plurality of segments of a random access channel occasion; and transmitting the control signal comprising the spatial relation configuration, wherein the spatial relation configuration indicates a segment of the plurality of segments.

Aspect 23: The method of any of aspects 16 through 19, further comprising: receiving the random access message via an uplink channel, wherein the random access message comprises a set of uplink channel repetitions of the random access message; and transmitting the control signal comprising the spatial relation configuration, wherein the spatial relation configuration indicates an uplink channel repetition of the set of uplink channel repetitions.

Aspect 24: The method of any of aspects 16 through 23, further comprising: receiving, from the UE, a set of one or more other uplink signals using the transmit beam in accordance with the spatial relation configuration, wherein the set of one or more other uplink signals comprise physical uplink shared channel signals, or physical uplink control channel signals, or sounding reference signals not configured for beam management, or a combination thereof.

Aspect 25: The method of aspect 24, further comprising: transmitting, to the UE, a radio resource control configuration indicating the set of one or more other uplink signals.

Aspect 26: The method of any of aspects 24 through 25, further comprising: transmitting, to the UE, a second control signal that includes a second spatial relation configuration for transmission, by the UE, of a second set of one or more other uplink signals, the second spatial relation configuration indicating that transmission of the second set of one or more other uplink signals is via a second transmit beam; and receiving, from the UE, the second set of one or more other uplink signals using the second transmit beam in accordance with the second spatial relation configuration.

Aspect 27: An apparatus for wireless communication at a UE, comprising a processor; memory coupled with the processor; and instructions stored in the memory and executable by the processor to cause the apparatus to perform a method of any of aspects 1 through 15.

Aspect 28: An apparatus for wireless communication at a UE, comprising at least one means for performing a method of any of aspects 1 through 15.

Aspect 29: A non-transitory computer-readable medium storing code for wireless communication at a UE, the code comprising instructions executable by a processor to perform a method of any of aspects 1 through 15.

Aspect 30: An apparatus for wireless communication at a base station, comprising a processor; memory coupled with the processor; and instructions stored in the memory and executable by the processor to cause the apparatus to perform a method of any of aspects 16 through 26.

Aspect 31: An apparatus for wireless communication at a base station, comprising at least one means for performing a method of any of aspects 16 through 26.

Aspect 32: A non-transitory computer-readable medium storing code for wireless communication at a base station, the code comprising instructions executable by a processor to perform a method of any of aspects 16 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
transmitting a random access message using a plurality of transmit beams during a random access procedure between the UE and a base station;
receiving, after performing the random access procedure, a control signal that includes a spatial relation configuration for transmission, by the UE, of an uplink signal, the spatial relation configuration indicating that transmission of the uplink signal is via a transmit beam selected from the plurality of transmit beams used in transmitting the random access message; and
transmitting the uplink signal using the transmit beam in accordance with the spatial relation configuration.

2. The method of claim 1, wherein transmitting the random access message further comprises:
transmitting the random access message using the plurality of transmit beams, wherein the random access message indicated in the spatial relation configuration is one of a preamble message, an uplink shared channel message, or a reference signal used by the UE during the random access procedure.

3. The method of claim 1, wherein receiving the control signal further comprises:
receiving the control signal as a radio resource control (RRC) signal or a medium access control (MAC) control element (CE) that configures the spatial relation configuration as a spatial relation information element.

4. The method of claim 3, further comprising:
receiving a downlink control information signal that schedules the uplink signal and that indicates an identity of the random access message for the spatial relation information element included in the control signal.

5. The method of claim 1, further comprising:
transmitting the random access message, as a preamble random access message, during each of a plurality of random access channel occasions, wherein each of the plurality of random access channel occasions is associated with a respective transmit beam of the plurality of transmit beams; and
identifying a specific one of the plurality of random access channel occasions on which transmission of the random access message was via the transmit beam selected from the plurality of transmit beams.

6. The method of claim 5, wherein identifying the specific one of the plurality of random access channel occasions comprises:
receiving an indication of the specific one of the plurality of random access channel occasions via the control signal comprising the spatial relation configuration or via a random access radio network temporary identifier corresponding to a second random access message received by the UE.

7. The method of claim 1, further comprising:
transmitting the random access message, in the form of a preamble random access message, during a random access channel occasion, wherein the random access message comprises a set of random access repetition messages in the random access channel occasion, each random access repetition message of the set of random access repetition messages associated with a respective transmit beam of the plurality of transmit beams; and
identifying a specific one of the set of random access repetition messages on which transmission of the random access message was via the transmit beam selected from the plurality of transmit beams.

8. The method of claim 7, wherein identifying the specific one of the set of random access repetition messages comprises:
receiving an indication of a repetition number corresponding to the specific one of the set of random access repetition messages via the control signal comprising the spatial relation configuration or via a random access radio network temporary identifier corresponding to a second random access message received by the UE.

9. The method of claim 1, further comprising:
transmitting the random access message via a plurality of segments of a random access channel occasion each associated with a respective transmit beam of the plurality of transmit beams; and
receiving the control signal comprising the spatial relation configuration, wherein the spatial relation configuration indicates a segment of the plurality of segments associated with the transmit beam selected from the plurality of transmit beams.

10. The method of claim 1, further comprising:
transmitting the random access message via an uplink channel, wherein the random access message comprises a set of uplink channel repetitions of the random access message; and
receiving the control signal comprising the spatial relation configuration, wherein the spatial relation configuration indicates an uplink channel repetition of the set of uplink channel repetitions.

11. The method of claim 1, further comprising:
transmitting a set of one or more other uplink signals after performing the random access procedure using the transmit beam in accordance with the spatial relation configuration, wherein the set of one or more other uplink signals comprises physical uplink shared channel signals, or physical uplink control channel signals, or sounding reference signals not configured for beam management, or a combination thereof.

12. The method of claim 11, further comprising:
receiving a radio resource control configuration indicating that the set of one or more other uplink signals support transmission using the transmit beam indicated via the spatial relation configuration.

13. The method of claim 11, further comprising:
receiving a second control signal that includes a second spatial relation configuration for transmission, by the UE, of a second set of one or more other uplink signals, the second spatial relation configuration indicating that transmission of the second set of one or more other uplink signals is via a second transmit beam; and
transmitting the second set of one or more other uplink signals using the second transmit beam in accordance with the second spatial relation configuration.

14. The method of claim 1, wherein the spatial relation configuration indicates spatial relation information, a transmission configuration indicator state, or both corresponding to the transmit beam used in transmitting the random access message.

15. The method of claim 1, wherein the uplink signal comprises a sounding reference signal, a physical uplink control channel signal, a configured grant physical uplink shared channel signal, a dynamic grant physical uplink shared channel signal, or a physical random access channel signal.

16. A method for wireless communication at a base station, comprising:
- receiving, from a user equipment (UE), a random access message during a random access procedure between the UE and the base station, the random access message associated with a plurality of transmit beams;
- transmitting, to the UE, a control signal that includes a spatial relation configuration for transmission, by the UE, of an uplink signal, the spatial relation configuration indicating that transmission of the uplink signal is via a transmit beam selected from the plurality of transmit beams used in transmitting the random access message; and
- receiving, from the UE, the uplink signal using the transmit beam in accordance with the spatial relation configuration.

17. The method of claim 16, wherein receiving the random access message further comprises:
- receiving the random access message using the plurality of transmit beams, wherein the random access message indicated in the spatial relation configuration is one of a preamble message, an uplink shared channel message, or a reference signal used by the UE during the random access procedure.

18. The method of claim 16, wherein transmitting the control signal further comprises:
- transmitting the control signal as a radio resource control (RRC) signal or a medium access control (MAC) control element (CE) that configures the spatial relation configuration as a spatial relation information element.

19. The method of claim 18, further comprising:
- transmitting a downlink control information signal that schedules the uplink signal and that indicates an identity of the random access message for the spatial relation information element included in the control signal.

20. The method of claim 16, further comprising:
- receiving the random access message, as a preamble random access message, during each of a plurality of random access channel occasions, wherein each of the plurality of random access channel occasions is associated with a respective transmit beam of the plurality of transmit beams; and
- transmitting, to the UE, an indication of a specific one of the plurality of random access channel occasions on which reception of the random access message was via the transmit beam, wherein the indication of the specific one of the plurality of random access channel occasions is transmitted via the control signal comprising the spatial relation configuration or via a random access radio network temporary identifier corresponding to a second random access message transmitted by the base station.

21. The method of claim 16, further comprising:
- receiving the random access message, in the form of a preamble random access message, during a random access channel occasion, wherein the random access message comprises a set of random access repetition messages in the random access channel occasion, each random access repetition message of the set of random access repetition messages associated with a respective transmit beam of the plurality of transmit beams; and
- transmitting, to the UE, an indication of a repetition number corresponding to a specific one of the set of random access repetition messages on which reception of the random access message was via the transmit beam, wherein the indication of the repetition number is transmitted via the control signal comprising the spatial relation configuration or via a random access radio network temporary identifier corresponding to a second random access message transmitted by the base station.

22. The method of claim 16, further comprising:
- receiving the random access message via a plurality of segments of a random access channel occasion each associated with a respective transmit beam of the plurality of transmit beams; and
- transmitting the control signal comprising the spatial relation configuration, wherein the spatial relation configuration indicates a segment of the plurality of segments associated with the transmit beam.

23. The method of claim 16, further comprising:
- receiving the random access message via an uplink channel, wherein the random access message comprises a set of uplink channel repetitions of the random access message; and
- transmitting the control signal comprising the spatial relation configuration, wherein the spatial relation configuration indicates an uplink channel repetition of the set of uplink channel repetitions.

24. The method of claim 16, further comprising:
- receiving, from the UE, a set of one or more other uplink signals using the transmit beam in accordance with the spatial relation configuration, wherein the set of one or more other uplink signals comprise physical uplink shared channel signals, or physical uplink control channel signals, or sounding reference signals not configured for beam management, or a combination thereof.

25. The method of claim 24, further comprising:
- transmitting, to the UE, a radio resource control configuration indicating that the set of one or more other uplink signals support transmission using the transmit beam indicated via the spatial relation configuration.

26. The method of claim 24, further comprising:
- transmitting, to the UE, a second control signal that includes a second spatial relation configuration for transmission, by the UE, of a second set of one or more other uplink signals, the second spatial relation configuration indicating that transmission of the second set of one or more other uplink signals is via a second transmit beam; and
- receiving, from the UE, the second set of one or more other uplink signals using the second transmit beam in accordance with the second spatial relation configuration.

27. An apparatus for wireless communication at a user equipment (UE), comprising:
- a processor;
- memory coupled with the processor; and
- instructions stored in the memory and executable by the processor to cause the apparatus to:
  - transmit a random access message using a plurality of transmit beams during a random access procedure between the UE and a base station;
  - receive, after performing the random access procedure, a control signal that includes a spatial relation configuration for transmission, by the UE, of an uplink signal, the spatial relation configuration indicating that transmission of the uplink signal is via a transmit beam selected from the plurality of transmit beams used in transmitting the random access message; and
  - transmit the uplink signal using the transmit beam in accordance with the spatial relation configuration.

28. The apparatus of claim 27, wherein the instructions are further executable by the processor to transmit the random access message by being executable by the processor to:

transmit the random access message using the plurality of transmit beams, wherein the random access message indicated in the spatial relation configuration is one of a preamble message, an uplink shared channel message, or a reference signal used by the UE during the random access procedure.

29. The apparatus of claim 27, wherein the instructions are further executable by the processor to receive the control signal by being executable by the processor to:

receive the control signal as a radio resource control (RRC) signal or a medium access control (MAC) control element (CE) that configures the spatial relation configuration as a spatial relation information element.

30. An apparatus for wireless communication at a base station, comprising:

a processor;

memory coupled with the processor; and instructions stored in the memory and executable by the processor to cause the apparatus to:

receive, from a user equipment (UE), a random access message during a random access procedure between the UE and the base station, the random access message associated with a plurality of transmit beams;

transmit, to the UE after performing the random access procedure, a control signal that includes a spatial relation configuration for transmission, by the UE, of an uplink signal, the spatial relation configuration indicating that transmission of the uplink signal is via a transmit beam selected from the plurality of transmit beams used in transmitting the random access message; and receive, from the UE, the uplink signal using the transmit beam in accordance with the spatial relation configuration.

\* \* \* \* \*